Aug. 2, 1955    K. C. SCHMOCKER    2,714,637
ELECTRIC SWITCHES
Filed Oct. 11, 1952    9 Sheets-Sheet 1
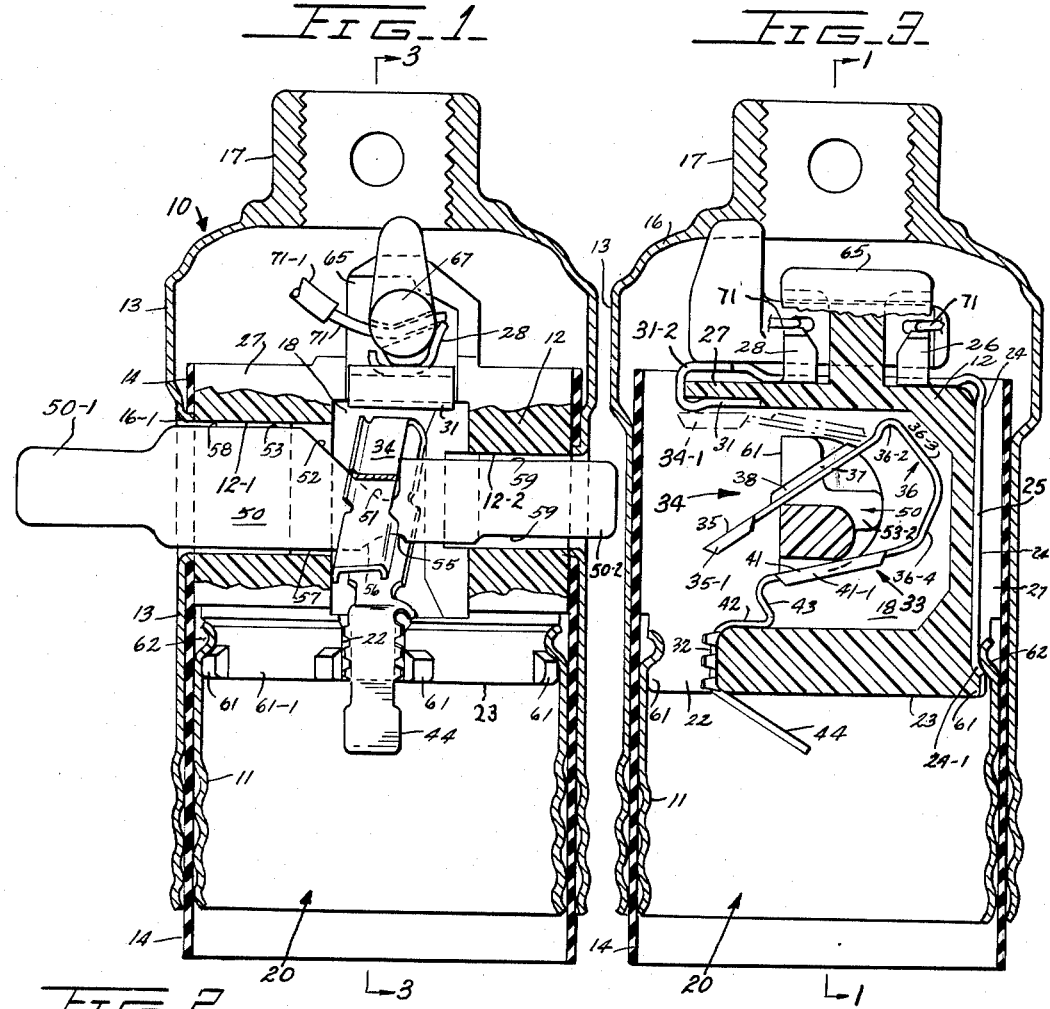
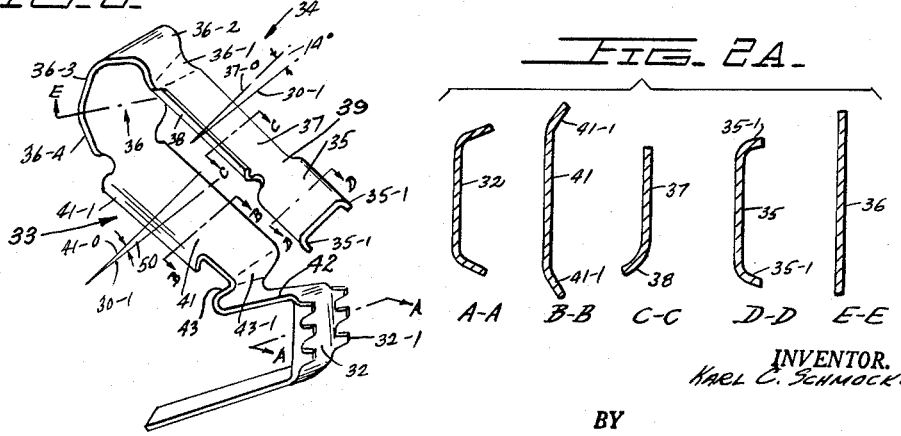
INVENTOR.
KARL C. SCHMOCKER
BY
Greene, Pineles & Durr
ATTORNEYS Aug. 2, 1955    K. C. SCHMOCKER    2,714,637
ELECTRIC SWITCHES
Filed Oct. 11, 1952    9 Sheets-Sheet 2
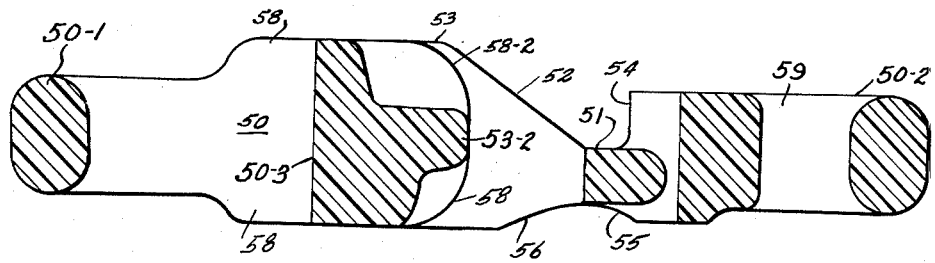
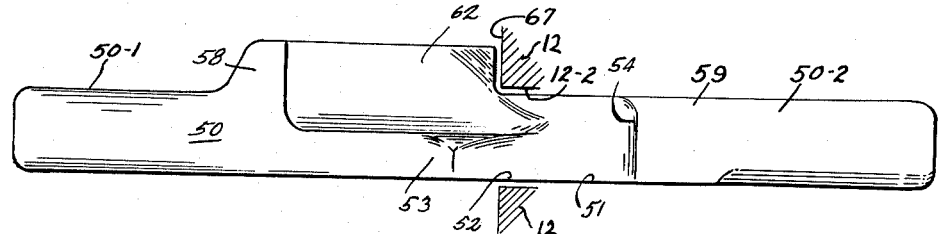
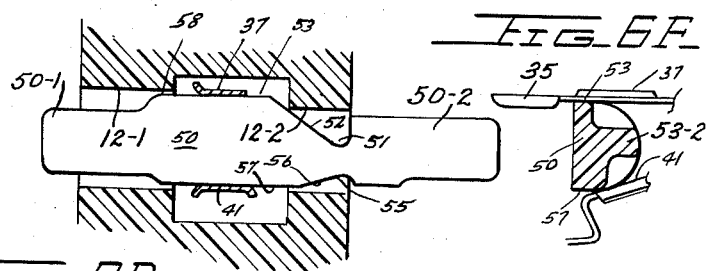
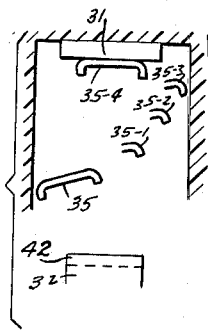
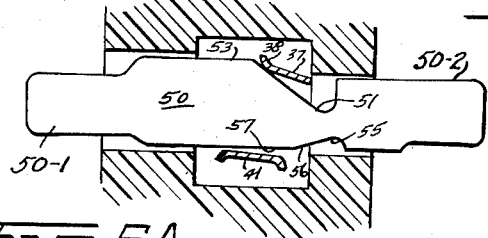
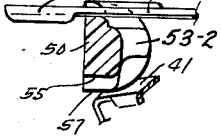
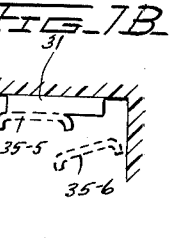
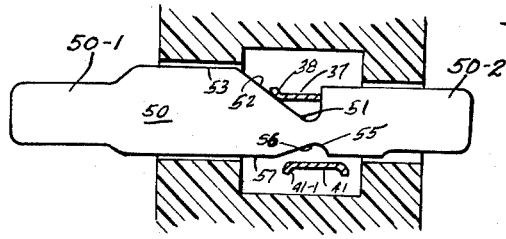
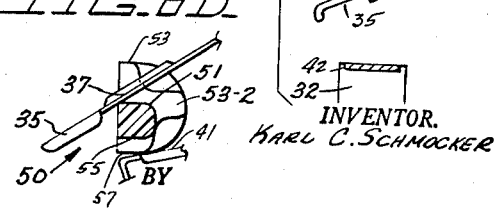
INVENTOR.
KARL C. SCHMOCKER
BY
Greene, Pineles & Durr
ATTORNEYS

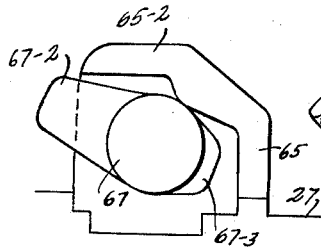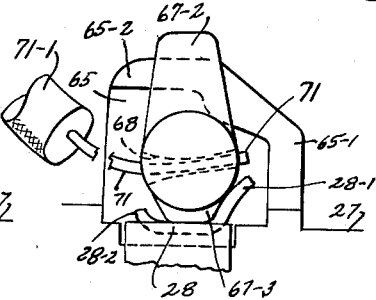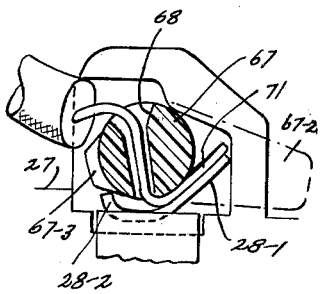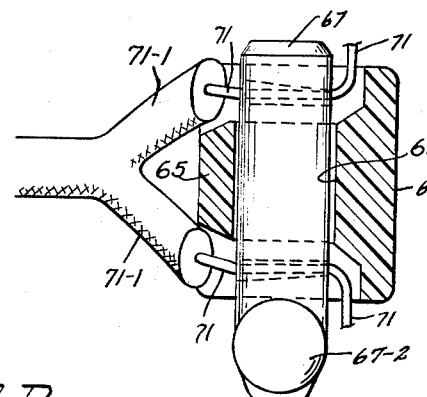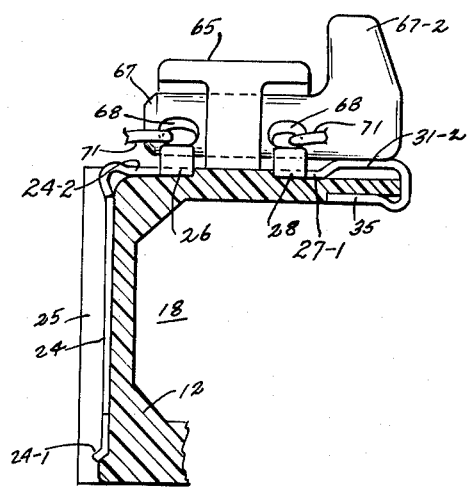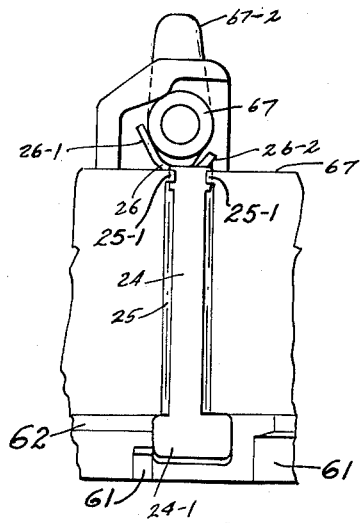

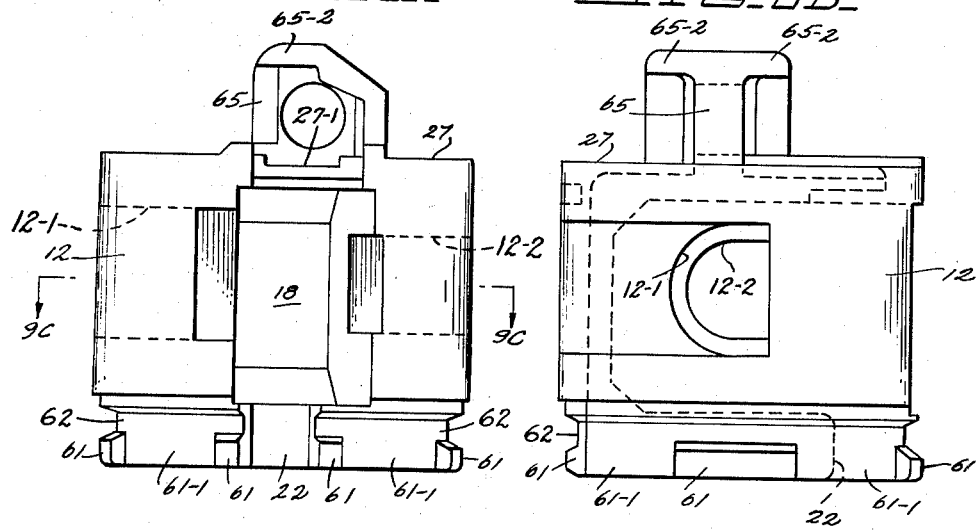

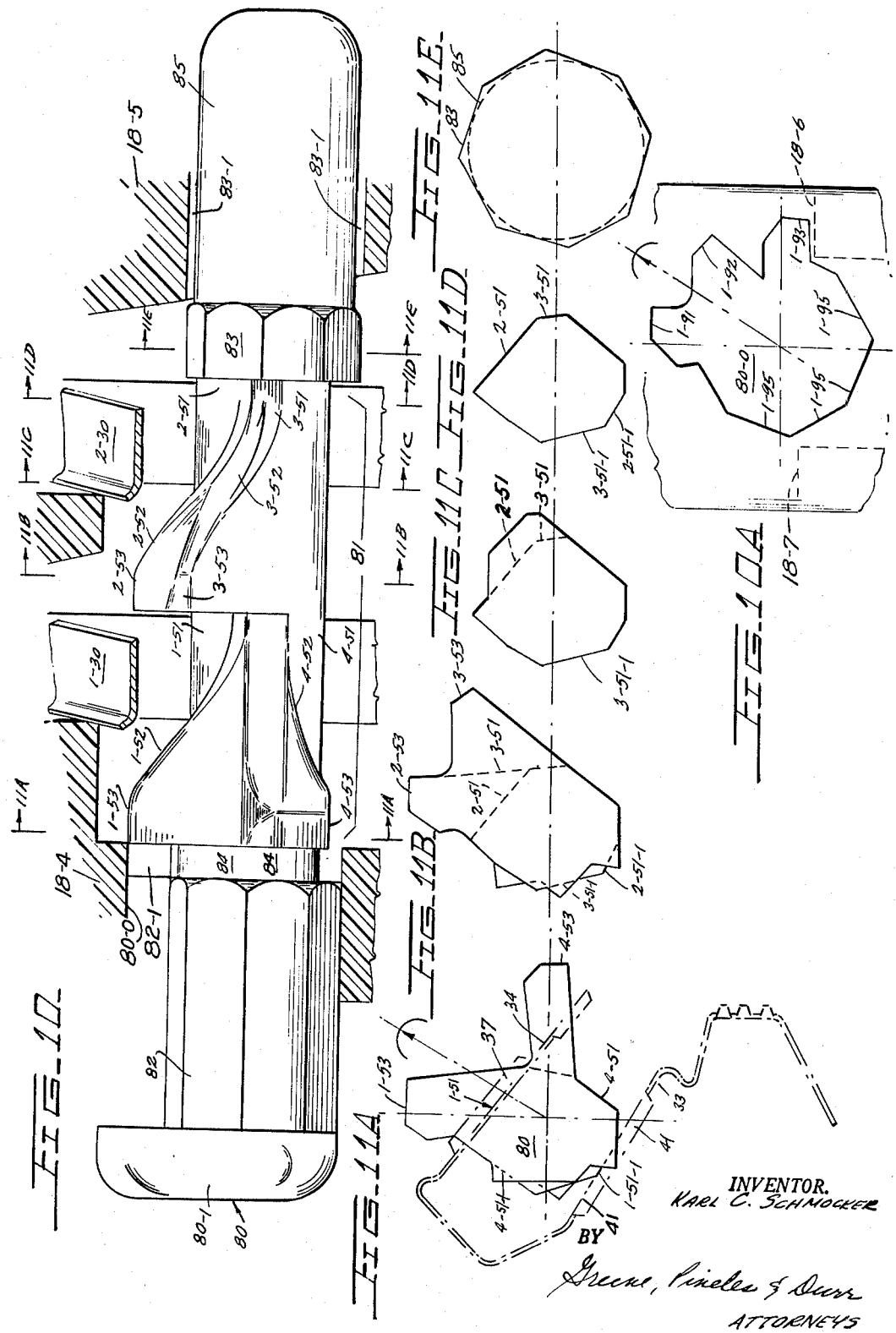

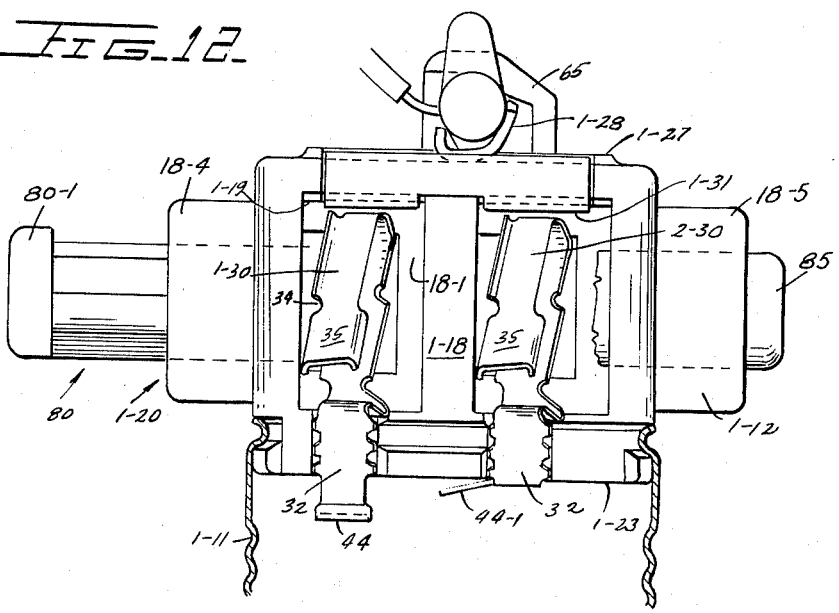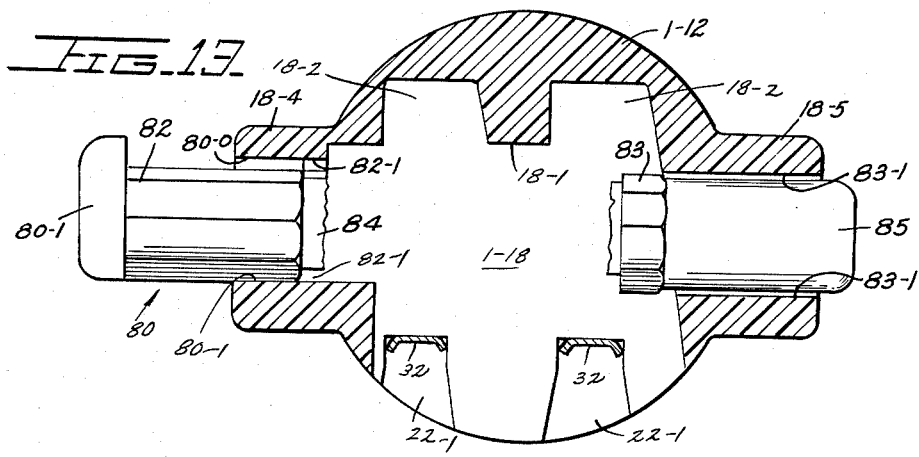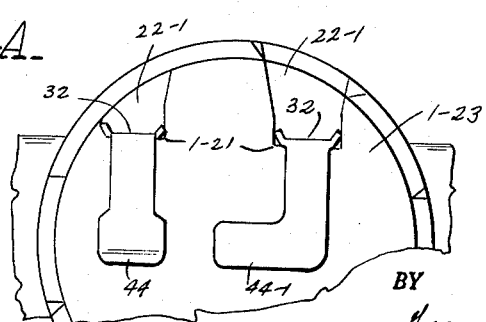

Aug. 2, 1955 K. C. SCHMOCKER 2,714,637
ELECTRIC SWITCHES
Filed Oct. 11, 1952 9 Sheets-Sheet 7
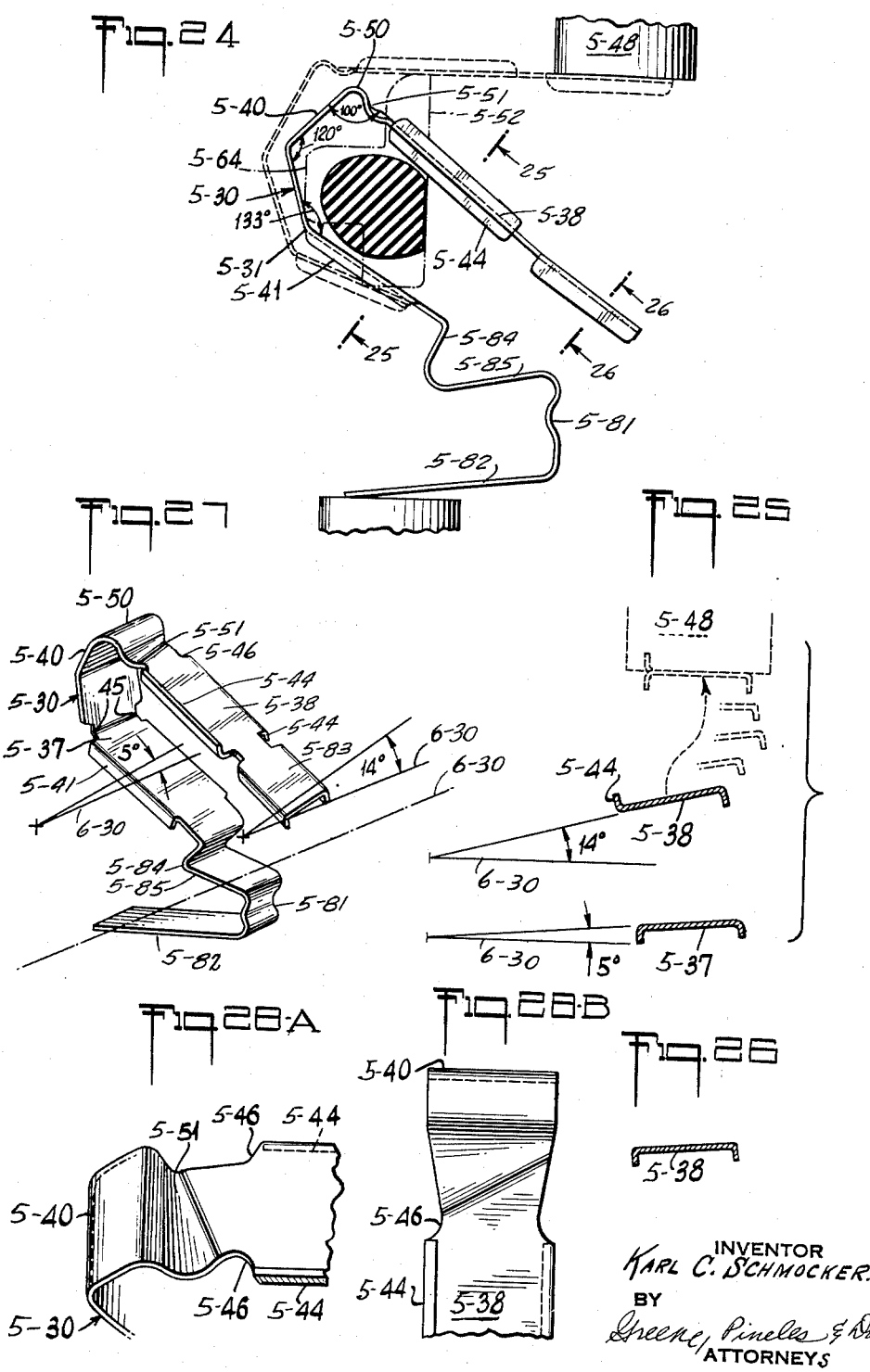

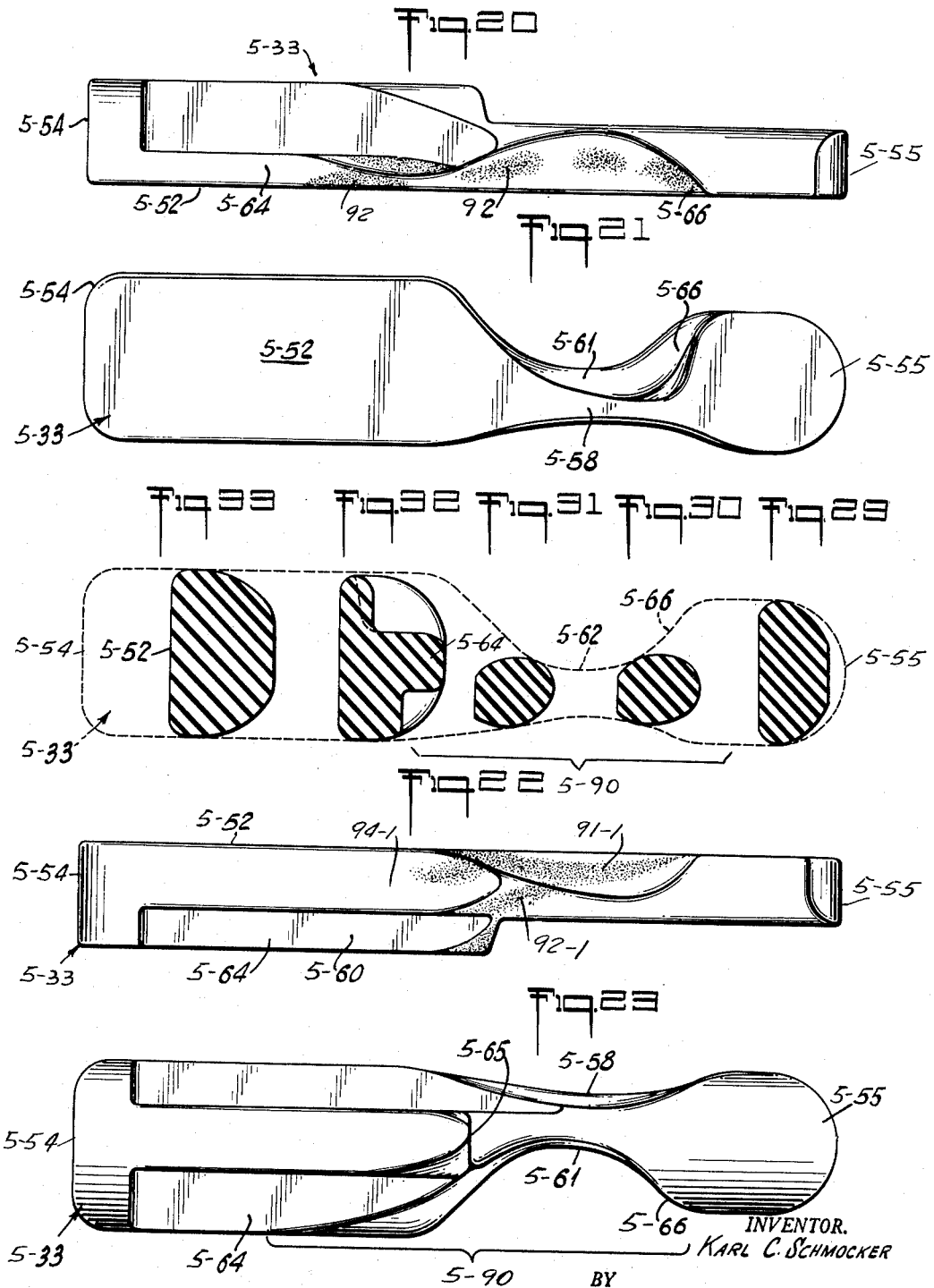

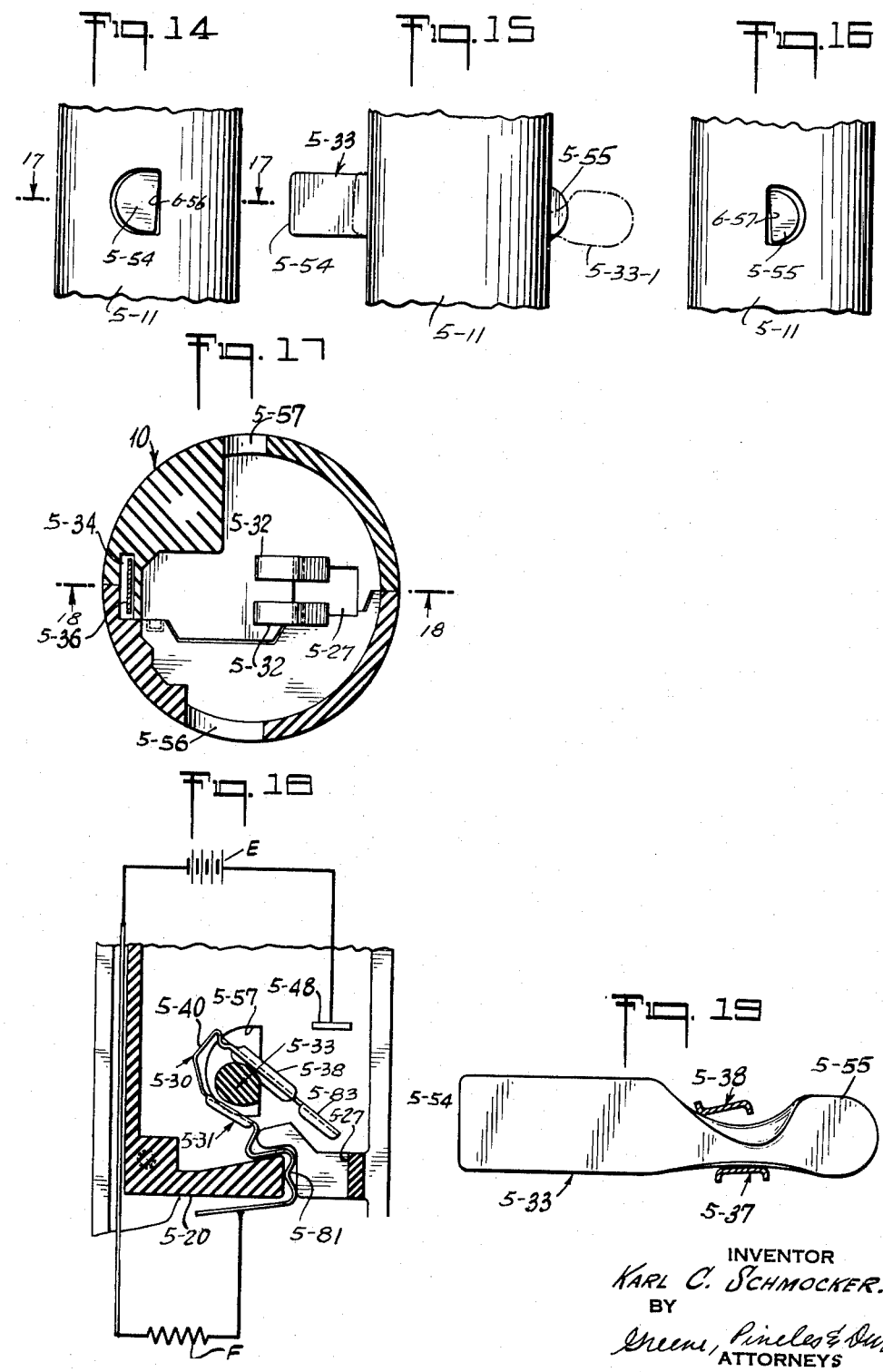

United States Patent Office 2,714,637
Patented Aug. 2, 1955

2,714,637

ELECTRIC SWITCHES

Karl C. Schmocker, White Plains, N. Y., assignor to Belmar Electric Corporation, Tilton, N. H., a corporation of New York Application October 11, 1952, Serial No. 314,271

45 Claims. (Cl. 200—68)

This invention relates to electric switches, and more particularly to snap action switches, although some of the phases of the present invention are of broader application.

This application is a continuation-in-part of my application Ser. No. 42,269, filed August 3, 1948.

Among the objects of the invention is a novel switch which closes and/or opens in a reliable manner with a snap action and which is at the same time simple in construction, inexpensive to manufacture, easy to assemble and disassemble, and has a long operating life.

Among the objects of the invention is a multiple switch arrangement having at least two movable switch members combined with a common actuating member selectively settable so that depending on the setting, movement of the actuating member between an open and a closed position will selectively close or open either one or the other of the two switches or both switches.

An object of the invention is an electric switch having its principal elements—without the switch actuating member—mounted in assembled position on an associated mounting structure or switch body, and arranged to be inserted as a unit through a relatively wide opening of a switch housing, the actuating member being insertable and releasably interlocked in its operative position within the switch body through passage openings of the switch housing, with the actuating member being also effective in releasably interlocking the switch body with the switch housing.

Another object of the invention is an electric switch which is combined with the associated elements of a conventional electrical lamp socket, so that the switch body or switch mounting structure with the associated elements of the socket body may be inserted as a unit—but without the switch actuating member—through the relatively wide opening of a conventional lamp socket housing, which housing may be made in the form of an integral structure, the actuating member being insertable and releasably latched in its operative position within the switch structure with the actuating member being also effective in releasably interlocking the switch and socket body with the socket housing.

A further object of the invention is a novel socket and switch body for electric lamp sockets which is of greatly simplified construction and materially reduces the cost of lamp sockets.

The foregoing and other objects of the invention will be best understood from the following description of exemplifications thereof, reference being had to the accompanying drawings wherein Fig. 1 is an enlarged elevational view partially in cross-section along line 2—2 of Fig. 3, of one form of a switch and lamp socket exemplifying the principles of the invention;

Fig. 2 is a perspective view of the flexible switch member of the switch of Fig. 1;

Fig. 2-A is an exploded view showing the cross-section of the switch member of Fig. 2 along transverse cross-section lines A—A, B—B, C—C, D—D and E—E.

Fig. 3 is a cross-sectional side view of the same lamp socket along line 3—3 of Fig. 1;

Figs. 4 and 5 are side and top views respectively, of the elongated actuating member of the switch of Figs. 1 and 3, Fig. 4 showing also the transverse cross-sectional areas of different parts of the actuating member;

Figs. 6-A, 6-B and 6-C are detail explanatory views, similar to Fig. 1, showing the switch actuating member and cooperating portions of the flexible switch member in three positions as it is moved from closed to open position;

Figs. 6-D, 6-E and 6-F are side views of the elements shown and corresponding to Figs. 6-A, 6-B and 6-C, respectively;

Fig. 7-A is a detail explanatory view similar to Fig. 1 of portions of the flexible switch member in the open position and in some displaced positions when actuated to its closed position;

Fig. 7-B is a view similar to Fig. 7-A of the same portion of the flexible switch member in the closed position and in displaced positions when the switch member is released for abrupt return to its open position;

Fig. 8-A is a detail view similar to Fig. 1 of portions of the socket core embodying the socket terminals;

Fig. 8-B is a side view of the socket core portions of Fig. 8-A as seen from the rear of Fig. 3;

Fig. 8-C is a somewhat enlarged top view of the socket core portions of Fig. 8-A;

Fig. 8-D is a front view of the socket core elements shown in Fig. 8-C;

Fig. 8-E is a view similar to Fig. 8-D of the same elements with the pivot pin in cross-section and turned to the cord lead locking position;

Fig. 8-F is a view seen from the back of Fig. 8-D of the same elements;

Fig. 9-A is an elevational view similar to Fig. 1 of the insulating mounting body of the socket core of Fig. 1;

Fig. 9-B is a side view of the same mounting body as seen from the rear of Fig. 3;

Fig. 9-C is a horizontal cross-sectional view of the mounting body of Fig. 9-A along lines 9C—9C of Fig. 9-A;

Fig. 9-D is a top view of the mounting body of Fig. 9-B;

Fig. 9-E is a bottom view of the mounting body of Fig. 9-A;

Fig. 10 is a view similar to Fig. 1 of portions of a two-switch lamp socket exemplifying the invention for three terminal light bulbs arranged for selectively connecting either one or the other of two light elements of a light bulb or both light elements to the electric supply line;

Fig. 10-A is a side view of a portion of the same socket core as seen from the left of Fig. 10;

Fig. 11-A is a transverse end view of the actuating member of Fig. 10, cut along line 11A—11A of Fig. 10, with the cooperating elements of one of the two flexible switch members actuated thereby;

Figs. 11-B, 11-C, 11-D and 11-E are transverse end views similar to Fig. 11-A of the actuating member of Fig. 10 cut along lines B—B, C—C, D—D and E—E;

Fig. 12 is a view similar to Fig. 1 of portions of the sawe two-switch lamp socket as shown in Fig. 10;

Fig. 13 is a horizontal cross-sectional view of the insulating mounting body of the same socket core;

Fig. 13-A is a bottom view of the mounting body of the socket core of Fig. 12 with the flexible switch members mounted thereon;

Fig. 14 is a fragmentary side elevation of a lamp socket housing exemplifying another form of the invention;

Figs. 15 and 16 are fragmentary side elevations of the same housing at 90° and 180° displacement from Fig. 14 illustrating in full and dotted lines, respectively, the open and closed circuit positions of the switch actuating member in relation to said housing;

Fig. 17 is an enlarged transverse sectional view taken on line 17—17 of Fig. 14 of some elements of the switch mechanism of the socket;

Fig. 18 is a sectional view taken on line 18—18 of Fig. 17;

Fig. 19 is a partially sectional view showing the relationship between the switch actuating member and the switch arms of the switch of Figs. 14–18 in the open-circuit position;

Fig. 20 is an enlarged plan view of the switch actuating member as seen from the top in Fig. 19;

Fig. 21 is an enlarged side view of the same switch actuating member as seen in Fig. 19;

Fig. 22 is a bottom view of the same switch actuating member seen from below in Fig. 20;

Fig. 23 is a bottom view of the same switch actuating member as seen from below in Fig. 21;

Fig. 24 is an enlarged view of the switch element in edge elevation, its open-circuit position being shown in full lines and its closed circuit position being indicated in dotted lines;

Fig. 25 is a transverse sectional view of the switch member on line 25—25 of Fig. 24 showing the angular relationship between the outer and inner arms of the switch element in open-circuit position and the path of the contact arm when moving to closed-circuit position;

Fig. 26 is a transverse sectional view of the switch member on line 26—26 of Fig. 24;

Fig. 27 is an enlarged perspective view of the switch element under open-circuit conditions;

Fig. 28-A is an enlarged fragmental perspective view of the structural portions of the switch element;

Fig. 28-B is a plan view of the switch portion shown in Fig. 28-A; and

Figs. 29, 30, 31, 32 and 33 are transverse sectional views of the actuating member along different portions of its length indicated by the associated dash-line conforming to its view in Fig. 23.

Although various features of the switch arrangement of the invention have many other applications, and may be combined with other elements into automatic circuit breakers, relays and other like structures, one form of a switch exemplifying the invention will be described in its application as an operating element of an electrical lamp socket intended for use with conventional screw-type electric light bulbs.

Figs. 1 to 5 show the principal elements of a screw-type lamp socket combined with a switch exemplifying the invention so that the switch body—without the associated switch actuating member—may be inserted into the socket housing through the relatively wide open end thereof, the switch actuating member being inserted and releasably locked in its operative position within the switch body through cooperating passage openings of the socket housing.

Referring to Figs. 1 and 3, the lamp socket 10 shown is similar in external shape to conventional lamp sockets, and is designed to receive the screw-type terminal base of a conventional electric light bulb within the threaded interior of a socket terminal sleeve 11 of sheet metal, the rear part of which is affixed to the mounting body or member 12 with which it forms the internal operating structure or core 20 of the socket 10.

In the form shown, the mounting body 12 is rigid and is made of mechanically hard electrically insulating material, by molding, for instance, and it has a shape of a generally cylindrical short block arranged to be seated within a generally cylindrical socket housing 13. The socket housing 13 is shown as formed of metal and separated by a sleeve 14 of insulating material such as thin cardboard from the core 12 and its metallic terminal sleeve 11. The socket housing 13 has an open end surrounding the open end of the terminal sleeve 11 and the other end of the socket housing 13 is provided with a closure end wall or cap 16 having at its center an inwardly threaded coupling collar 17 of conventional shape. In the form shown, the cylindrical socket housing and its closure cap or end wall 16 constitute an integral socket housing structure 13.

The insulating mounting body 12 of the socket core 20 serves as a support for a switch having as principal elements a flexible metallic switch member generally designated 30 arranged to cooperate with a fixed metallic switch member 31 for closing and opening a circuit by movement of the flexible switch member 30 from the open position shown in Fig. 3 to the closed dash-line position shown therein. In the form shown, the principal elements of the switch are positioned within a compartment 18 of the insulating mounting body 12. The fixed switch contact 31 is shown secured to an upper mounting wall portion 27 of the insulating body 12. The movable switch member 30 has a mounting portion 32 held affixed in a recessed lower mounting wall portion of a channel 22 formed in the lower wall 23 of the mounting body 12.

In the particular form of switch shown, the flexible switch member 30 has an inner switch arm 33 held secured with its mounting portion 32 to the mounting wall portion 21 of the insulating body 12, the inner switch arm 33 carrying at a spacing from the mounting wall portion 21 a movable outer contact switch arm 34 arranged to be moved from the full-line open switch position shown in Fig. 3 to the closed dash-line position 34–1.

The particular switch shown in Figs. 1 to 3 is designed for actuation from the open to the closed position by movement of a switch actuating member generally designated 50 from the open position shown in Fig. 1 to the right thereof as indicated in Figs. 6-A, 6-B, 6-C showing the three consecutive positions of the actuating member 50 as it is moved to the closed position. The opening of a switch member 30 is effected by return movement of the actuating member 50 back to its left open position in which it is shown in Fig. 1.

The flexible metallic switch member 30 is shown formed of an elongated strip of highly elastic and highly conductive metal, such as beryllium copper, the strip being permanently deformed into a generally S-shaped loop structure which it maintains in its released open position in which is seen its perspective view in Fig. 2 and its side view in Fig. 3.

In the form shown, the outer contact arm 34 of the flexible switch member 30 is provided at its outer end with a contact portion 35 which is brought into circuit closing and opening contact position with the fixed switch contact member 31. The contact portion 35 of the contact arm 34 is rendered stiff or rigid against deformation by two rearwardly turned flanges 35-1 on its opposite side edges, it being assumed in this description that the movement of the switch member 30 to the outward closed position represents its outward or forward direction or orientation. The outer contact arm 34 of the flexible switch member 30 is also provided with an intermediate actuating portion 37 which is rendered stiff or rigid against deformation by an outward marginal flange 38 on one side edge thereof. The stiff actuating portion 37 of the contact arm 34 is connected through a flexible arm portion 39 to its forward stiff contact portion 35.

In the form shown, the stiff outer contact arm portion 37 and the stiff inner arm portion 33 of the strip-shaped switch member 30 are joined to each other by an intermediate generally U-shaped or arc shaped elbow portion 36 which is designed to permit elastic flexing of the outer switch arm 34 relatively to the inner switch arm 33 in the forward movement when the outer switch arm 34 is moved in outward forward direction from the open position of Fig. 3 to the closed position of Fig. 3–A and also to permit lateral flexing of the outer switch arm 34 relatively to its forward and rearward movement directions when performing circuit closing and circuit opening operations.

In the form shown, the inner switch arm 33 has an intermediate backing arm portion 41 which is rendered stiff or rigid by rearwardly turned opposite side flanges 41–1. The inner switch arm 33 of the flexible switch member 30 is spaced by an arm spacing from the outer contact arm 34 and is joined to its mounting portion 32 and the adjoining flexible rear stem portion 42 by an S-shaped flexible strip portion 43 which is designed to permit flexing and displacement of the inner arm 33 and the flexible arm portion 43 in rearward or downward direction as seen in Fig. 3.

For reasons explained more fully hereinafter, and without thereby limiting the scope of the invention, it has been found desirable to shape the flexible switch member 30—specifically designed for actuation to the closed position by an actuating member 50 movable from the left to the right as seen in Fig. 1—so that in the released open position in which it is shown in Figs. 1, 2, 3 and in the full line position of Fig. 7–A, it has the shaped features outlined below.

The forward contact portion 35 of the outer switch arm 34 is displaced to the left of its inner arm 33 and its rear stem portion 42 as seen in Figs. 1, 6–A and 7–A. The stiff inner arm portion 41 is permanently twisted out of the normal plane of the metal strip from which it is formed so that its transverse formation line 41–0 is inclined under an angle of about 5° relatively to a transverse base line of the original metal strip which has a horizontal direction in Fig. 1 and Fig. 2 and is indicated in Fig. 2 by a horizontal base line 30–1 which the rear arm portion 42 tends to maintain. The stiff outer contact arm portion 37 is permanently twisted out of the normal plane of the metal strip out of which it is formed so that a transverse formation line 37–1 thereof is at an angle of about 14° to 15°, relatively to a transverse base line 30–1 thereof indicated in Fig. 2 by the horizontal base line 30–1.

In the practical construction of the flexible switch 30 as shown in Fig. 2 and in Figs. 1 and 3, the inner stiff contact portion 41 is given the desired permanent twist deformation by suitable forming dies acting on the junction region thereof indicated in Fig. 2 as extending between the dash lines 43–1. The outer contact arm is given the desired permanent twist deformation by suitable forming dies acting on the junction region thereof indicated in Fig. 2 as extending between the dash lines 36–1 and forming part of the U-shaped elbow 36 of the flexible switch 30.

The flexible U-shaped switch elbow 36 is formed of sections 36–2, 36–3 and 36–4 which are set so that the flexible arm section 36–2 is bent slightly forwardly relatively to the adjoining stiff outer arm section 37; and that the adjoining flexible arm sections 36–2 and 36–3 enclosing an angle of about 98°; that the adjoining flexible arm sections 36–3 and 36–4 enclose an angle of about 120°; and that the adjoining flexible arm sections 36–4 and 41 encloses an angle of about 130°. It should be noted however, that although Fig. 3 indicates that the individual arm sections 36–2, 36–3, 36–4 and 41 of the flexible elbow region 36 of the switch member 30 are disposed at definite angles relatively to each other, good results are obtained with the flexible elbow region 36 of the flexible switch 30 shaped to form a continuous curve extending along the several angularly disposed arm sections 36–2, 36–3, 36–4.

The mounting portion 32 of flexible switch member 30 may be affixed to the adjacent mounting wall portion 21 in a variety of ways. In case of socket switches shown, a satisfactory mounting is provided by forming the opposite edges of the flat mounting strip portion 32 with laterally bent tooth projection 32–1 which are pressed by wedging action against the parallel side walls of the open channel 22 formed in the mounting wall. With this arrangement, the mounting portion 32 with its wedge teeth 32–1 has to be merely forced in into its operative position in the seating channel 22, whereupon it remains firmly affixed therein.

It should be understood that for switches of the type described above designed for actuation by a similar actuating member 50 which moves from right to the left as seen in Fig. 1, the different elements of the flexible switch member have to be shaped for cooperation in an analogous manner with the approaching control elements of the actuating member 50 moving from the open left side position thereof as seen in Fig. 1 to a right side closing position.

Being intended for an electric lamp socket, the rear part of the movable switch member 30 is provided with a tail portion 44 constituting a contact terminal which contacts the electric terminal at the screw terminal base of an electric light bulb which is screwed into the threaded terminal sleeve 11 of the core 20. In the form shown, the terminal sleeve 11 is connected through a stiff metallic terminal connector strip 24 held positioned within a surface recess 25 (Figs. 8–A, 8–B, 9–A–9–D) of the insulating body 12 and having a terminal portion 26 positioned on the upper wall 27 of the mounting body 12 and serving as one terminal connection to an electric cord lead through which the socket is supplied with electric current. The fixed switch contact member 31 is similarly formed of a stiff metallic conductor strip bent into U-shaped clamp and held clampingly affixed over another part of the upper mounting wall portion 27 overlying the switch compartment 18 of the insulating mounting body 12. The upper arm of the clamping strip of contact member 31 has a terminal portion 28 positioned on the upper wall 27 of the mounting body 12 and serving as the other terminal connection to an electric cord lead through which the socket is supplied with electric current.

Referring to Figs. 1—6–D, in accordance with the invention, the flexible switch member 30 and the cooperating actuating member 50 are so constructed and designed that the initial movement of the actuating member 50—from its open position shown in Figs. 1 and 6–A to its right hand closed position shown in Fig. 6–C—causes the outer switch contact arm 34 to be moved toward the outward forward closed position and at the same time to be flexed laterally relatively to the path of its outward closing motion against the action of its elastic restoring forces; and that the further movement of the actuating member 50 to its closed position releases the restoring energy stored in the switch member 30 by its lateral flexing for bringing the contact portion 35 of the switch member 30 with a snap action into contact engagement with the fixed switch contact 31.

In accordance with a further phase of the invention, the flexible switch member 30 and the cooperating actuating member are so constructed and designed that the initial movement of the actuating member 50—from its closed position shown in Fig. 6–C to its open position shown in Figs. 1 and Fig. 6–A—causes the outer switch contact arm 34 to be flexed laterally relatively to the path of its inward opening motion against the action of its elastic restoring forces while remaining in contact with the fixed switch contact 31; and that further movement of the actuating member 50 to its open position shown in Fig. 6–A, releases the restoring energy stored in the switch member 30 by its original outward flexing to the closed position and the added initial lateral flexing just described for causing the contact portion 35 of the switch member to be released with a snap action from its contact engagement with the fixed switch contact 31 and to thereafter return the actuating member 50 to its open position shown in Figs. 1 and 6–A as the outer contact arm 34 is returned to its open position shown in Fig. 3 by the elastic restoring forces stored therein incident to the outward flexing to the closed dash-line position 34–1 shown in Fig. 3.

In the form shown in Figs. 1, 3 to 6–F, the actuating member 50 is formed of mechanically hard electrically insulating material into a relatively rigid elongated shaped body arranged to move transversely to switch in direction (of switch arm 34) across the switch compartment 18 through the spacing between the switch arm 34 and the bottom compartment wall 21 of the insulating mounting body 12. In the particular form shown, the elongated actuating member is arranged to move transversely through the arm spacing between the outer stiff contact arm portion 37 and the inner stiff contact arm portion 41 of switch member 30 when the actuating member 50 is moved from the open position shown in Fig. 1 and Fig. 6–A to the right hand closed position shown in Fig. 6–C for closing the switch and in opposite direction for opening the switch.

The intermediate region of the elongated actuating member 50 is provided, on the forward or upper side as seen in Figs. 1 and 6–A, with a set of shaped control or cam surfaces shown in the form of an outwardly facing notch-like depressed cam surface portion 51 rising at one side along a forwardly tapering cam surface 52 to an outer cam surface portion 53. The depressed cam surface portion 51 of the actuating member 50 is followed at the right by an abruptly rising surface portion 54 which bounds with the tapered cam surface 52 a locking recess or notch within which the stiff upper contact arm portion 37 is held interlocked and normally prevented from removal from its operative position with respect to the cooperating elements of the switch.

The intermediate region of the elongated actuating member 50 is shown provided at its bottom or rearward side as seen in Figs. 1 and 6–A with an additional set of shaped control or cam surfaces in the form of a depressed shallow cam surface portion 55 rising to the left along a rearwardly tapering cam surface 56 to a raised cam surface portion 57 and rising to the right to the maximum rearward level of the adjoining rightward portion of the actuating member 50 as seen in Fig. 1. It should be noted that the forwardly tapering cam surface 52 and the opposite rearwardly tapering cam surface 53 reach their opposite raised cam surface portions 53, 57 at substantially the same vertical transverse formation line of the actuating member 50. The elongated actuating member 50 has also at its opposite end regions a wider guide portion 58 and a narrow guide portion 59 adjoining the outer ends of the intermediate cam surface portions 51 to 57, the guide portions 58, 59 serving to guide the actuating member 50 within opposite guide wall passage openings 12–1, 12–2 (Fig. 1) formed in the side walls of the insulating mounting body 12 bordering the switch compartment 18. The guide passage openings 12–1, 12–2 (Figs. 1, 9–A, 9–B) are shown as being of substantially D-shape and have one flat side guide surface arranged to guide a flat back guide surface 50–3 of the actuating member 50.

The guide passage opening 12–1 wherein the greater guide portion 58 of the actuating member is guided is of larger height and width than the guide passage opening 12–2 within which the other smaller guide portion 59 of the actuating member 50 is guided. The cam surface regions 51 and 55 of the actuating member 50 is of smaller thickness than the wider guide region 58 thereof. The backwardly facing side of the cam surface region of the actuating member 50 (as seen in Fig. 1) is provided with laterally raised stop portion 53–2, the rightward end of which (as seen in Fig. 5) is arranged to engage and be stopped by the inwardly facing compartment wall 67 of the mounting body 12 to provide a positive stop against movement of the actuating member beyond the position in which it effects closing the switch contacts 35, 31 so that no elements other than the solid and strong elements of the insulating mounting body 12 are exposed to stopping strains when the actuating member is pushed to the stop position in which it is shown in Fig. 6–C.

The upwardly facing outer cam surface portion 53 (as seen in Figs. 1, 3, 4, 5) is of somewhat smaller thickness than the deeper recessed cam surface region 51 thereof and the two cam surface regions merge into each other along smooth curved surfaces in the manner indicated in Figs. 3, 4 and 5. The downwardly facing cam surface regions 55, 56 and 57 (as seen in these figures) likewise merge along smooth curved surfaces into each other to provide like the upwardly facing cam surface regions 51 to 53 smooth control and cam action in moving and controlling the operation of the portions of the flexible switch member 30 when actuating it either from the open to the closed position or from the closed to the open position. All these cam surfaces 51 to 57 are curved smoothly in their frontwise direction where they face the curved upper side flange 38 of the stiff upper contact arm portion 37 and the corresponding side flange 41–1 of the stiff inner contact arm portion 41.

The elongated actuating member 50 has opposite grip end portions 50–1, 50–2 at least one of which is exposed along the exterior of the mounting body 12 and also of the socket housing 13 so that one or the other of the grips 50–1, 50–2 of the actuating member 50 may be manually engaged for pushing it from one switch position to the opposite socket position in its transverse movement through the compartment space 18 as seen in Fig. 1.

The cross-sectional contour of the cam surface regions 51 to 57 of the actuating member 50 varies throughout the length and width thereof to provide a series of subordinate control or cam surface portions of appropriate length, width and pitch which are so related to each other and to the shape of the different elements of switch member 30 that they selectively engage portions of its two switch arms 33 and 34 between which they move for causing the outer contact arm 34 to be brought with a snap action to the circuit closing position, when closing the switch and to cause the actuating arm 34 to be released with a snap action from the closed circuit position and return it to the open position when opening the switch by opposite movements of the actuating member 50 between the open position of Fig. 6–A and the closed position of Fig. 6–C. As seen in Fig. 3–A, only a relatively narrow zone of the longitudinally extending curved opposite cam surface portions 51 to 53 and 55 to 57 come into engagement with facing flanged edges of the stiff outer and inner contact arm portions 37 and 41 when the rightward movement of the actuating member (as seen in Figs. 1, 6–A to 6–D) acts on these flanged contact arm edges as the contact arm 30 is thereby brought from the open position (Figs. 1, 3, 6–D) to the closed position (Figs. 6F, 7A). By arranging for the stiff contact arm portions 37 and 41 to move with their rounded flanged edges on only a narrow zone of the elongated smoothly curved opposite longitudinal cam surfaces 51 to 53 and 55 to 57, frictional movement resistance is minimized. This is an important factor in assuring foolproof operation of the switch of the invention.

The significance of the various cam surface portions 51 to 57 of the actuating member 50 and the cooperating elements of the movable switch member 30 in performing snap action circuit closing and circuit opening operations will now be described by explaining their progressive effectiveness in performing such operations.

Starting with the switch member 30 in the open position—with the actuating member 50 retained in the open position by the engagement of the released stiff upper contact arm section 37 with the notch-like cam surface depression 51 of the actuating member—a circuit closing operation will now be described in more detail.

In the initial rightward movement of the actuating member 50 (by a push force applied to its manipulating end 50-1) from the open position shown in Figs. 1, 3 and 6-A, the upwardly tapering cam surface 52 engages the flanged rounded edge of the stiff upper contact arm portion 37 thereby raising it upwardly and also moving it laterally to the right as seen in Figs. 1 and 6-A, 6-B thereby elastically deforming the flexible switch member 30 until contact arm portion 37 is raised to the upper cam surface portion 53 as seen in Fig. 6-C.

Fig. 7-A shows the outer contact portion 35 of the upper contact arm 37 in its relation to the mounting portion 32 of the switch member 30 and also its successive positions 35-1, 35-2, 35-3, 35-4 to which it is brought by the upward and lateral displacement imparted to the adjoining upper stiff contact arm portion 37 as a result of the progressive rightward movement of the actuating member 50 from its leftward open position (Figs. 1, 6-A) through an intermediate position shown in Fig. 6-B into its circuit closing end position shown in Fig. 6-C. Toward the end of its progressive movement to its open position, the upwardly tapering cam surface 52 of the actuating member 50 brings the contact portion 35 to an extreme lateral position indicated at 35-3 (Fig. 7-A) at a moment when the stiff upper contact arm portion 37 is about to leave the tapered cam surface 52 and reach the upward cam surface 53 somewhat beyond the position shown in Fig. 6-B. The instant the flanged edge portion 38 of the contact arm portion 37 reaches along the rightward moving upwardly tapering cam surface 52 the level of the upper cam surface 53 of the actuating member 50 with its maximum lateral deformation, the laterally rightward displaced stiff upper contact arm portion 37 is released from the tapered cam surface 52 whereupon it moves with a snap action to the left along the upper level cam surface 53 as seen in Fig. 6-C thereby bringing the contact end portion 35 with a snap action and a contact wiping action into contact engagement with the fixed switch contact 31 as seen at 31-4 in Fig. 7-A.

In the above described movement of the actuating member from the open position in Fig. 1 and 6-A to its closed position (Fig. 6-C), the lower tapered cam surface portion 56 comes similarly into engagement with the facing curved edge of stiff inner arm portion 41 of switch arm 33 and imparts thereto a downward deforming movement as seen in Figs. 3 and 6-A-6-D which is in a direction opposite to the upward deforming movement imparted to the outer contact arm 34. By this action, additional restoring energy is stored in the flexible elements 43, 42 of the lower switch arm 33 thereby providing additional backing pressure forces acting upwardly through actuating member 50 and its upper cam surface 53 and thus increasing the pressure with which the upper contact arm portion 34 presses its contact portion 35 into sliding contact engagement with the fixed switch contact 31 and maintains it therein from the moment when it is brought to the circuit closing contact engagement therewith shown in Fig. 6-C.

When the actuating member 50 is thus moved from the open position of Figs. 1 and 6-A to the closed position of Fig. 6-C, its oppositely tapered cam surfaces 52 and 56 press in opposite direction against the embracing opposite stiff switch contact arm portions 37 and 41 respectively as the upper contact arm portion 37 is forceably moved laterally to the right as seen in Fig. 6-B. In the course of the further movement of the actuating member 50 toward its rightward closed position seen in Fig. 6-C, the upper contact arm portion 37 is released by the end of the tapered upper cam surface 52 from its laterally displaced rightward position (Fig. 6-B), whereupon the released stiff contact arm portion 37 brings the upwardly pressed contact portion 35 thereof with a snap and wiping action into a centered closed contact position with the fixed switch contact 31 (Fig. 7). In this closed position, the contact portion 35 is pressed into contact engagement with the fixed switch contact 31 by the combined pressure exerted thereon by the embracing engagement of the opposite outer cam surface regions 53 and 57 with the upper and inner stiff switch arm portions 37 and 41 supplemented by the elastic restoring forces exerted by the deformed and compressed flexible bottom portion 43 of the elastic switch member 30.

When the rightward movement of actuating member 50 has brought the contact portion 35 of the upper contact arm 34 to the switch closing position shown in Fig. 6-C, the outwardly pressed stiff upper contact arm 37 and stiff inner backing arm portion 41 are seated against the generally level and raised opposite cam surface portions 53, 57 of the actuating member 50 in which the switch member 30 and the actuating member 50 are in a state of equilibrium and wherein the contact portion 35 of the upper contact arm 34 is retained with the required pressure in contact with the fixed switch contact member 31, as seen in Figs. 6-C and 7-A.

The guide passage openings 12-1, 12-2 which guide the guide portions 58, 59 of the actuating member 50 in its movement between its closed and open positions are somewhat oversized to provide slight clearance and permit angular adjustment of the actuating member 50 and its curved cam surfaces 52, 56 while in embracing engagement with the stiff switch arm portions 37, 41 between which it moves, thereby facilitating smooth action in performing circuit-closing and opening operations, and also eliminating the need for excessive accuracy in fabricating the cooperating switch parts.

Describing now a circuit opening operation, it is assumed the actuating member 50 is in its rightward position (Fig. 6-C) wherein it maintains equilibrium with the elastic restoring forces of the deformed switch member 30 held in the closed position (Fig. 6-C). Opening of the switch is effected by applying a pushing force to the exposed manipulating end 50-2 of the actuating arm projecting through an opening of the socket housing to the right thereof, as seen in Figs. 1, 6-A-6-C. The metallic contact portion 35 of the contact arm 34 resting in wiping contact engagement with the relatively smooth contact surface of the fixed switch contact 31 offer only negligible frictional resistance for movement along their contact engagement surfaces. As seen in Fig. 6-C, the upper cam surface portion 53 of the actuating member 50 which is of non-metallic molded hard material, engages the back surface of the stiff upper contact arm portion 37 with substantial frictional resistance so that initial leftward movement of the actuating member 50 from the closed position of Fig. 6-C toward the open position of Fig. 6-A imparts to the upper switch arm portion 37 and its contact portion 35 a leftward lateral movement in relation to the direction of its circuit-opening movement, thereby bringing the upper contact portion 35 from its central position against the fixed contact 31 shown in Fig. 7-A to the leftward position 35-4 shown in Fig. 7-B. In other words, the initial movement of the actuating member 50 from its closed position (Fig. 6-C) to the left for opening the switch contacts, brings the contact arm portion 35 of the upper switch arm from the centered position shown in Fig. 7-A to the laterally displaced leftward position shown at 35-4 in Fig. 7-B.

At the instant when the course of the further leftward movement of the actuating member 50 from the closed position (Fig. 6-C) toward the left open position, the upper end of the upwardly tapering cam surface 52 of the actuating member 50 reaches the left edge flange 38 of the upper contact arm portion 37, the stiff upper contact arm portion 37 is suddenly released from its holding engagement with the upper level cam surface 53 of the actuating member 50, whereupon the elastic restoring forces stored in the upwardly bent arm 34 and the adjoining rear portions 36, 43, 44 of the elastic switch member 30 are suddenly released and cause the upper contact arm 34 to be returned with a snap action to its open position in which it is shown in Fig. 6–A. This snap action with which the upper contact arm 37 is released also releases its contact portion 35 with a snap and contact wiping action from its contact engagement with fixed switch contact 31.

The moment the left flanged edge 38 (as seen in Fig. 6–C) of the upper contact arm portion 37 is thus released with a snap action onto the upper region of the downwardly tapering upper cam surface 52 of the actuating member 50, the elastic restoring forces acting on the deformed upper switch arm 34 cause its flanged upper arm portion 37, 38 to forceably engage the downwardly tapering inclined cam surface 52 of the actuating member 50 thereby forceably returning it with a snap action and a leftward movement to its open position in which it is shown in Figs. 1, 6–A. In other words, in opening the switch, it is sufficient to merely push the actuating member 50 leftward from the position of Fig. 6–C to the position where the left flanged edge 38 of the upper contact arm portion 37 reaches the upper region of the downwardly inclined upper cam surface 52 as seen in Fig. 6–C, whereupon the elastic restoring forces of the deformed switch member 30 exerted through the upper switch arm 34 forecably return the actuating member 50 with a snap action to its left open position as seen in Fig. 6–A. In the course of this opening movement, the contact end portion 35 of the upper contact arm 34 moves successively through the intermediate positions indicated at 35–5, 35–b in Fig. 7–B to the open released position 35.

Furthermore, in the arrangement shown, when returning the actuating member 50 to its open position by the suddenly released outwardly deformed elastic switch member 30, both the stiff outer contact arm portion 37 and the stiff inner contact arm portion 41 act on the opposite inwardly tapered cam surfaces 52 and 56 embraced thereby and impart to the actuating member 50 a sudden leftward return movement and bring it to its open position. However, it should be noted that a similar sudden snap action returning movement will be imparted to the actuating member 50 if it is exposed to the restoring forces acting on the upper switch arm 34 only and transmitted thereby to the actuating member 50 by the engagement of the flanged edge of the stiff upper contact arm portion 37 with the tapered upper cam surface 52 of the actuating member 50.

Switches of the invention of the type described above may be readily combined with a housing and interlocked in its interior position within the housing by the actuating member 50 with which the movable switch member 30 is actuated between its closed and open positions. The insulating mounting structure 12 may be shaped so that it constitutes a filler core which is inserted into a housing closed on all sides except on one side through which the filler core with the switch member is inserted into the housing interior after first removing the actuating member 50 from its interlocked position within a switch member 30.

The actuating member 50 may be readily removed from its interlocked position by inserting a pin or narrow rod through the channel opening 22 of the mounting wall 21, in upward direction as seen in Fig. 3, so that the inner end of the pin comes into engagement with the end contact portion 35 of the upper contact arm 34 whereupon the pin is pushed further inwardly until the upper contact arm 34 is raised to its upward position, such as shown 34–1 in Fig. 3, in which the actuating member 50 is free from interlocking engagement with any portion of the switch member 30 and may be freely removed through the wider passage opening 12–1 of the insulating body 12. The actuating member 50 may be readily returned to its inward operative position shown in Fig. 1 by merely inserting its smaller end 50–2 through the larger guide opening 12–1 of the insulating body 12, with the flat guide wall 50–3 of the actuating member 50 placed against the adjacent flat guide wall of the large guide opening passage 12–1, whereupon the actuating member 50 is further pushed inwardly until the upper contact arm portion 37 of the switch member 30 riding on the guide surface 59 of the actuating member 50 drops into the recessed cam surface portion 51 of the actuating member and thereupon becomes interlocked therewith.

The housing 13 with which the switch body 12 is combined is provided with passage openings similar to the passage openings 12–1 and 12–2 of the insulating body 12 in positions of alignment therewith for interlockingly joining the separable switch body 12 and its switch mechanism with the housing.

Fig. 1 shows the socket core 20 with its switch body 12 interlocked within the socket housing 13 in the manner described above. The cylindrical socket housing 13 has two aligned passage openings of a shape and size corresponding to the passage openings 12–1, 12–2, 65 and 66 of the insulating body 12. The socket core 20 with its switch body 12 may be readily removed from the socket housing 13 by pushing a pin by way of lower open end of the housing 13 into the wall channel 22 of the insulating body 12 until the pin raises the free contact arm end 35 of the upper contact arm 34 to a raised position in which the notched portion 51 of the actuating member 50 is released from interlocking engagement with the contact arm portion 37, whereupon the actuating member 50 is removed from the assembly, in which condition the socket core 20 with its switch body 12 may be freely removed from the housing 13. The socket core 20 with its switch body may be readily combined with its socket housing 13 by inserting the core 20 into the interior of the housing with the passage openings 12–1, 12–2 of the core body 12 properly aligned with the similar housing openings whereupon the actuating member 50 is inserted with its smaller end 50–2 through the aligned larger passage opening 12–1 and pusher inwardly until the switch member portions 37 become interlocked with the notch depression 51 of the actuating member 50.

The socket of the invention described above embodies various other desirable features which greatly simplify the manufacture of sockets.

Referring to Figs. 1, 3, and 8–A–9–E, the fixed contact member 31 is part of a terminal connector strip which is formed of a stiff elastic and electrically conducting metal strip bent into a generally U-shaped clamp having an upper terminal arm 31–2 and arranged to be held clamped by elastic deformation of its two arms when they are forcibly seated over the upper mounting wall portion 27 of the insulating mounting body 12. The upper mounting wall surface 27 has a recess 27–1 in which a portion of the upper terminal arm 31–2 is retained, thus providing a positive seat therefor and for the fixed contact portion 31 of its lower arm. The inward end of the terminal arm 31–2 is shaped into a U-shaped terminal portion 28 having two upwardly extending terminal jaws 28–1, 28–2. The lower cylindrical portion of the insulating mounting body 12 is provided with arcuate locking tooth projections 61 separated from each other by arcuate depressions 61–1. The arcuate tooth projections 61 of the mounting body 12 form borders of an annular locking recess 62 extending along the cylindrical bottom region of the insulating body 12. The upper portion of the cylindrical socket sleeve 13 is held affixed against axial and rotary movement by inwardly deforming it or clinching it into the segmental arcuate grooves 61–2 between the locking teeth 61 and into the annular locking groove 62, in the manner indicated in Figs. 1 and 3.

The cylindrical side wall of the insulating mounting body 12 forming the rear wall of the switch compartment 18 has formed therein an elongated recess 25 arranged to receive and hold in position the elongated terminal connector strip 24 through which the socket terminal sleeve 11 is supplied with current. The connector strip 24 is formed of the same stiff elastic metal as the fixed terminal strip 31. The connector strip 24 is retained within the recess by clamping engagement of its lower outwardly bent edge 24–1 with the overlying inwardly clinched upper border portion of the cylindrical metallic socket terminal sleeve 13. The upper portion of the elongated recess 25 in which the terminal strip 24 is mounted is provided with two shoulder portions 25–1, overlying the edges of the somewhat wider upper portion of the connector strip 24 for retaining it in its operative position after it has been pushed downwardly behind the shoulder portions 25–1. The upper wall surface 27 of the insulating mounting body 12 adjoining the strip recess 25 is provided with a recess 25–2 arranged to receive therein an angularly bent terminal arm 24–2 of the connector strip 25. The inward end of the bent terminal arm 24–2 is formed into a U-shaped terminal portion 26 having two upwardly extending terminal jaws 26–1, 26–2 similar to those terminal jaws 28 of the terminal arm 31–2 of the fixed switch contact 31.

The upper mounting wall 27 has a pivot boss projection 65 extending between the upright opposite polarity terminal jaws 26, 28 of the socket. The pivot boss projection 65 serves as a pivot support having a transversely extending pivot hole 66 arranged to pivotally seat a generally cylindrical pivot pin 67 arranged to pass between the opposite jaws of the two upright terminal jaws 26, 28 forming the two upper socket terminal members 26, 28. The pivot boss support 65 is provided with a rear wall 65–1 and roof portions 65–2 overlying the regions of the upper mounting wall 27 on which the two upright terminal jaws 26, 28 are held. The pivot pin 67 is provided at its front end with a tapered end portion 67–1. The two sets of terminal jaws of the two terminal members 26, 28 are generally aligned with the pivot hole 66 of the pivot support 65, and the opposite jaw lips 26–1, 26–2 and 28–1, 28–2 of the two terminal members 26, 28 are spaced closer than the thickness of the pivot pin 67 so that when the tapered end 67–1 is inserted between them the two pair of jaw lips of the two jaws 26, 28 will be elastically forced and spread as the pin 67 is pushed between them to the inward pin position shown in Figs. 1, 3, 8–A–8–F.

The pivot pin 67 is provided at the regions opposite the two terminal jaws 26, 28 with transverse funnel-shaped holes 68 with the wider funnel opening positioned nearer the lower jaw lips 26–2, 28–2 of the two jaw terminals 26, 28. The two funnel holes 68 of the pivot pin 67 are so arranged that the strip conductor ends 71 of two insulated conductor leads 71–1 may be inserted and passed through the funnel holes 68 by pushing them through the wider funnel opening toward the rear wall 65–1 of the pivot boss projection 65 with the end portions of the two conductors 71 passing over and adjacent the higher jaw lips 26–1, 28–1 of the two terminal jaws 26, 28.

The pivot pin 67 with its pivot holes 68 through which the conductors 71 are thus passed, are so arranged and seated between the two opposite polarity terminal jaws 26, 28 that by turning the pivot pin 67 90° from the position shown in Figs. 1, 3, 8–A, 8–D the cylindrical pin surface adjoining the two projecting conductor ends 71 forces and wedges the conductor ends 71 between the cylindrical surface portions of the pin 67 and the terminal jaw lips of the two socket terminals 26, 28 to assure a firm and positive conducting connection therebetween.

To facilitate turning of the pivot pin 69 by 90° from the position shown in Fig. 1 in which the conductor ends 71 may be readily inserted into their funnel holes 68, the pivot pin 67 is provided with a lever projection 67–2 which may be gripped for turning it 90° to a lowered position against the upper wall 27 of the insulating body 12.

The pivot pin 67 is also provided with locking means for locking it in a position in which its grip 67–2 is turned downwardly against the mounting wall 27 and the conductor ends 71 are wedged in conducting engagement with the jaw lips of the two upper socket terminals 26, 28. In the form shown, two portions of the pivot pin 67 in the region of the two opposite polarity terminal jaws 26, 28 are provided with small locking projections 67–3 which ride on the inner concave surfaces of the respective terminal jaws 26, 28 when the pivot pin 67 is turned from the conductor receiving position to the conductor locking position. The two tooth projections 67–3 are arranged to elastically deform the lower jaw lips 26–2, 28–2 of the two terminal jaws 26, 28 as they pass thereover and become interlocked therewith so as to prevent inadvertent turning of the pivot pin 67 from the conductor clamping position to the conductor releasing position. However, by application of a positive turning force to the pivot grip 67–2, the pin 67 may be readily turned from the conductor clamping position to the conductor releasing position as the two lock projections 67–3 are arranged to force the jaw lips 26–2, 28–2 against which it is interlocked away from it and permit lock projections 26–2, 28–2 to move thereafter along the inner concave surface of the two terminal jaws 26, 28 as the pin 67 is brought to the conductor releasing position.

Figs. 10 to 13 show the principal parts of a socket core of a two-switch three-way lamp socket exemplifying the invention and which operates with two flexible switch members and a common selectively settable actuating member for connecting either one light element only or another light element only or both light elements of a two-light element electric light bulb of a conventional type, having a conventional screw terminal base with three terminals on the base.

The various elements of the socket core 1–20 of Figs. 10 to 13 are generally similar to those described above in connection with the socket core 20 of Figs. 1 to 9–E. The socket core 1–20 may be housed in a two part metal housing (not shown) similar to the housing 13 of Figs. 1, 2 modified to accommodate the wider portions of the socket core 1–20, the socket housing having a detachable cap attached to the cylindrical housing in a conventional way after inserting the socket core into the wider part of the cylindrical socket housing. However, as in the socket of Figs. 1 to 9–E, the socket core of Figs. 10 to 13 may be designed for use with one piece metallic or insulating socket housing into which the socket core is inserted from the open bottom end thereof, with the socket core interlocked within the housing by the switch actuating member in a manner similar to that described in connection with Figs. 1 to 9–E.

The two switch socket core of Figs. 10 to 13 is designed to receive the screw type terminal base of a conventional two-light element electric light bulb within the threaded interior of a socket terminal sleeve 1–11 of sheet metal, the rear part affixed to the insulating mounting body 1–12 in the same manner as the corresponding similar elements of Figs. 1 to 9–E, which are made of the same materials. The insulating mounting body 1–12 serves as a support for two flexible switch members 1–30, 2–30 identical with the flexible switch member 30 of Figs. 1 to 9–E and arranged for closing and opening a circuit by movement of the respective flexible switch members 1–30, 2–30 from the open position in which one of these switch members is shown in Fig. 11–A to a closed position in which the contact portion 35 of the upper switch arm 34 makes circuit closing contact engagement with a fixed switch contact shown as parts of a single fixed switch member 1–31 held affixed to the upper part of the mounting body 1–12. The fixed switch member 1–31 forms part of a U-shaped clamp clamped to an upper mounting wall portion 1–19 of the mounting body 1–12 and provided on the upper mounting wall 1-27 with upright terminal jaws 1-28 similar to the corresponding elements of the fixed switch member 31 of Figs. 1 to 9-E.

Each of the two flexible switch members 1-30, 2-30 has its mounting portion 32 held affixed with the angularly bent wedging teeth within a recessed lower mounting wall portion 1-21 which forms the deepest part of a channel 22-1 formed in the lower mounting wall 1-23 of the mounting body 1-12. The upper mounting wall 1-19 and the lower mounting wall portion 1-21 of the mounting body 12 bound a switch compartment 1-18 within which are positioned the flexible movable parts of the two switch members 1-30 and 2-30 in the same way as the switch member 30 is positioned in the switch compartment 18 of the mounting body 12 of Figs. 1 to 9-E.

The switch compartment 1-18 of the mounting body 1-12 is subdivided at its rear by a partition wall 18-1 which partitions the rear part of the switch compartment 1-18 into two partition compartments 18-2, in which the U-shaped elbow part 36 of the two switches 30-1, 30-2, are operatively positioned.

The two flexible switch members 30-1 and 30-2 are identical with that of the socket of Figs. 1 to 9-E except for the fact that the switch member 2-30 has an L-shaped terminal tail portion 44-1 (Fig. 13-A) which makes contact with the central base terminal of the light bulb while the normal tail terminal 44 of switch member 1-30 makes contact with the concentric ring terminal of the light bulb.

The two flexible switch members 1-30, 2-30, are arranged for selective actuation from the released open to the elastically deformed closed position by movement of an elongated switch actuating member generally designated 80. In accordance with the invention, the elongated switch actuating member 80 is arranged to be set in at least two, and as shown, in three different setting positions so that by movement of the actuating member in one setting position, only switch member 30-1 is actuated between the open and closed positions; that by movement of the actuating member in another setting position, only the other switch member 30-2 is actuated between the open and closed positions; and that by movement of the actuating member in the third setting position, both switch members 30-1 and 30-2 are actuated between their open and closed positions. The actuating member 80 has longitudinal cam surfaces arranged to move between their closed and open positions through the arm spacing of the two switches 1-30, 2-30 in a direction transverse to the switching movement of the two switches.

Figs. 10, 10-A and 11-A to 11-E show in more detail the characteristic features of the cooperative relationship between the different elements of the actuating member 80 and of the cooperating elements of the switch members 1-30, 2-30 and the associated socket mounting body 1-12 in performing selective circuit closing and opening operations of the two switch members.

In the form shown, the elongated actuating member 80 has an intermediate longitudinal control region, generally designated 81 which is embraced by the outer arm 34 and the inner arm 33 of each of the two flexible switch members 1-30, 2-30 in each of the three different settings of the actuating member 80 for performing selective circuit closing and opening operations of the two switch members.

The elongated actuating member 80—with its intermediate control region 81 positioned between the outer arm 34 and the inner arm 33 of each of the two flexible switch members 1-30, 2-30—is arranged for longitudinal movement therebetween from a circuit opening position in which the actuating member 80 is shown in Figs. 10 and 13 to a rightward circuit closing and vice versa in a manner analogous to the similar operations of the elongated actuating member 80 of the switch of Figs. 1 to 9-E.

The elongated switch member 80 is shown provided at its left end with a pointer grip or knob 80-1 and is arranged to be guided in each of its three different settings in a positive manner by an octagonal front guide portion 82 and a similar octagonal rear guide portion 83 shaped to engage correspondingly shaped octagonal guide passages 82-1, 83-1 formed in the opposite side walls 18-4, 18-5 of the insulating mounting body 1-12 bordering the switch compartment 1-18 (Figs. 10, 13).

In addition, the front and rear part of the elongated actuating member 80 is provided with cylindrical guide surface portions 84, 85 arranged to permit free turning movement of the elongated guide member in its left outward open position in which it is shown.

The octagonal and cylindrical front guide surfaces 82, 84 and rear guide surface 83, 85 of the elongated guide member 80 and the corresponding guide passages in the mounting side walls 18-4, 18-4 are so shaped and arranged that when the actuating member 80 is in the left outer retacted position shown in Figs. 10 and 13, the actuating member 80 may be turned around its longitudinal axis with its cylindrical guide surfaces 84, 85 engaging the octagonal guide passage openings 82-1, 83-1 to any one of its three different setting positions described more fully hereinafter; and that when the actuating member 80 is pushed inwardly into the switch compartment 1-18 to the right from the position of Figs. 10 and 13, the octagonal front and rear guide surfaces 82, 83 of actuating member 80 will engage the octagonal guide passage openings 82-1, 83-1 of the mounting body 1-12 and prevent turning of the actuating member 80 while in the inward position or while it is performing a longitudinal switch controlling movement in one of its three settings. It should be noted that in the position in which it is shown in Figs. 10 and 13, the octagonal front guide portion 82 of the elongated actuating member 80 is free from engagement with the relatively short octagonal guide passage opening 82-1 formed in the surrounding mounting wall 18-3, and that the portion of this mounting wall 18-4 surrounding the octagonal guide portion 82 of the actuating member 80 is of cylindrical shape and permits a free rotation of its octagonal guide front portion 82 therein.

The elongated actuating member 80 is provided along its control surface region 81 with three sets of control surface elements corresponding to the three settings which are arranged to perform the different switch and control operations in the three different settings, respectively. For convenience in the description, "double-switch setting" designates herein the setting wherein movement of the actuating member 80 causes both switch members 1-30, 2-30 to be closed and opened; rear-switch setting designates the setting wherein movement of the actuating member causes the rear switch member 2-30 only to be closed and opened; and front-switch setting designates the setting in which the movement of the actuating member causes the opening and closing of the front switch member 1-30 only. The different control surface portions of the control surface region 81 of the actuating member 80 which operates to selectively perform these operations in the three different settings will now be described.

*Double switch setting.*—Figs. 10, 11-A to 11-E show the actuating member in the double switch setting in which the control surface region 81 of the actuating member—which moves longitudinally to the right from the position shown and returns to it between the upper arm 34 and the inner arm 33 of the two flexible switch members 1-30, 2-30. In this setting, the cam surface region 81—has two sets of vertically aligned generally notch shaped outwardly tapering control or cam surface elements, to wit, the set of notch-like outwardly tapered cam surface elements 1-51, 1-52, 1-53 cooperating with the upper arm 34 of switch member 1-30 and a similar set of notch-like outwardly tapered cam surface elements, 2–51, 2–52, 2–53 cooperating with the upper arm 34 of switch member 1–30 in the same manner as the generally similar notch-like cam surface elements 51, 52, 53 cooperate with the upper arm 34 of switch member 30 of the socket of Figs. 1 to 9–E for closing and opening the same.

In this double switch of the actuating member 80, its longitudinally moving set of outwardly tapering control or cam surface elements 1–51, 1–52, 1–53, cooperate with the upper contact arm 34 of the first or front flexible switch member 130 for performing circuit-closing and circuit-opening operations in the same manner as the control surface elements 51, 52, 53 of actuating member 50 to effect circuit closing and opening by the similar switch arm 34 of the socket of Figs. 1 to 9–E described above. In this double-switch setting, the additional set of outwardly tapering control cam surface elements 2–51, 2–52, 2–53 cooperate with the upper contact arm 34 of the second or rear switch member 2–30 in the same manner as the control surface elements 1–51, 1–52, 1–53 cooperate with switch member 1–30 in closing and opening the switch circuit.

As seen in Figs. 10 to 13, the two sets of cam surface elements 1–51, 1–52, 1–53, and 2–51 to 2–53 are generally aligned in a substantially vertical plane in which they are shown and are so arranged that when the actuating member 80 is moved from the left open position shown toward the right, the two sets of control surface elements come into engagement with the flanged edges of the upper contact arm portion 35 of each of the two switch members 1–30, 2–30 and deform them in upward and lateral direction until they bring with a snap action their contact elements 35 into circuit-closing contact with their fixed switch contact member portions 1–31 in the same manner as the corresponding cam surface elements 51, 52, 53 effect snap action closure of the switch arm 34 of the socket, of Figs. 1 to 9–E.

The actuating member 80 is arranged to be restrained against rotation from its double switch setting, unless forcibly turned therefrom to another of its three settings as by a turning force applied to its control knob 80–1. The desired rotation restraining action is secured by restraining and biasing forces exerted by the flat upper contact arm portion 37 of the switch member 1–30 on the generally flat inward control surface element 1–51 of the actuating member and by the additional restraining action exerted by the flat inner contact arm portion 41 on the additional flat control surface element 1–51–1 lying opposite to control surface element 1–51 on the opposite side of the actuating member 80 (Figs. 10, 11–A). An additional rotation restraining action which maintains actuating member 80 in its double switch setting is secured by the restraining and biasing forces exerted in a similar manner by the flat upper contact arm portion 37 and the flat inner contact arm portion 41 of the other switch member 2–30 on the flat control surface element 2–51 and the opposite supplemental flat control surface element 2–51–1 of the portion of the control region 81 of the actuating member 80 embraced by these two arms of the switch member 2–30.

*Rear switch setting.*—When the front end of the actuating member 80 is turned by its knob 80–1 45° to the left, when viewed from its knob end 80–1 as seen in Fig. 11–A, the actuating member 80 is brought to the rear switch setting in which inward longitudinal movement thereof to the right effects snap action closure of the rear switch member 2–30 only and snap action opening thereof by the return movement to the left of the actuating member to the retracted position similar to that seen in Fig. 10. In this rear switch setting of the actuating member 80, its control surface region 81 has a set of generally notch-shaped outwardly tapering cam surface elements 3–51, 3–52, 3–53, all aligned in a vertical plane as seen in Figs. 10, 11–B, 12, and arranged to cooperate with the upper arm 34 of the rear switch member 2–30 and cause it to close and open its circuit with a snap action in the same manner as the generally similar notch-like cam surface elements 51, 52, 53 cooperate with the upper arm of switch member 30 of Figs. 1–7–B for closing and opening the same.

In other words, in this rear switch setting, the second switch member 2–30 is brought into cooperative relationship with the outwardly tapering vertically aligned cam surface elements 3–51, 3–52, 3–53 of actuating member 80 which are arranged to cooperate therewith for causing the upper arm 34 of switch member 2–30 to close and open its circuit with a snap action in the same way as cam surface elements 51, 52, 53 cooperate with the outer arm of switch member 30 of the socket of Figs. 1 to 9–E in closing and opening it.

The actuating member 80 is arranged to be restrained against rotation from its rear switch setting unless forcibly turned therefrom as by a turning force applied to its control knob 80–1. The desired rotation restraining action is secured by the restraining and biasing forces exerted by the flat surfaces of outer switch arm 35 and inner switch arm 41 of rear switch member 2–30 on the flat control surface element 3–51 of the actuating member 80 and the opposite lying flat control surface element 3–51–1 embraced by these two switch arms. The control surface elements 3–51 and 3–51–1 are generally flat and are forcibly restrained by engagement along substantial areas with the generally flat embracing surfaces of the opposite contact arm portions 37, 41 of switch member 2–30 in the same manner as the corresponding elements of switch 1–30 restrain rotation of the actuating member 80 in the double switch setting by restraining engagement with its two sets of flat opposite control surface elements 1–51, 1–51–1 and 2–51, 2–51–1 as explained above.

*Front switch setting.*—When the front end or knot end 80–1 of the actuating member 80 is turned 45° to the left from its rear switch setting, or 90° to the left from its double switch setting (when viewed from its knob end 80–1 as seen in Fig. 11–A), the actuating member 80 is brought to its front switch setting in which inward longitudinal movement thereof to the right (as seen in Fig. 10) effects snap action circuit closure of the front switch member 1–30 only and in which leftward return movement of the actuating member to the retracted outward left position effects snap action circuit opening by switch member 1–30 only. In this front switch setting of actuating member 80, its control region 81 has a set of notch-shaped outwardly tapering cam surface elements 4–51, 4–52, 4–53 aligned in a vertical plane as seen in Figs. 10, 11–A, 12 and arranged to cooperate with the upper arm 34 of switch member 1–30 only and cause it to close and open its circuit with a snap action in the same manner as the generally similar notch-like cam surface elements 51, 52, 53 cooperate with the upper arm of switch member 30 of the socket of Figs. 1 to 9–E for closing and opening the same.

In this front switch setting, the first switch member 1–30 is brought into cooperative relationship with the outwardly tapering cam surface elements 4–51, 4–52, 4–53 which are arranged to cooperate with the outer arm 34 of switch member 1–30 for closing and opening the switch in the same manner as cam surface elements 51, 52, 53 cooperate with the upper arm of switch member 30 of the socket of Figs. 1 to 9–A in closing and opening the same. In order to restrain the actuating member 80 in this front switch setting, the flat inward cam surface element 4–51 thereof and an opposite supplemental flat cam surface element 4–51–1 thereof (Figs. 10, 11–A) are in restraining engagement along extended flat surface portions thereof with the extended flat surface portions of the opposite contact arm portions 37 and 41 of switch member 1–30 embracing the same in a manner analogous to restraining and biasing action exerted by the two switches on the corresponding flat turning-restraining control surface elements of the actuating member 80 in its other two switch settings as explained above.

The actuating member 80 has its four sets of cam surfaces so shaped that they form on its exterior inwardly extending notches which are interlockingly engaged by the outer arm 34 of the two flexible switch members 1-30, 2-30 so as to prevent removal of the actuating member 80 from its operative position between the switch arms of the two switches 1-30, 2-30 and the interior of the socket body 1-12 in all settings and operative positions of the actuating member 80 in the same manner as the switch member 30 of the socket of Figs. 1 to 9-F remains interlocked with the notch of the actuating member 50 and prevents removal of the actuating member 50 from its position within its mounting body 12. As in the socket of Figs. 1 to 9-E, the actuating member 80 of the two-switch socket may be removed from its inward operative position within its mounting body 1-12 shown in Figs. 10 and 12, by pushing two pins inwardly through the opening channels 22-1 on the bottom wall 1-23 of the mounting body 1-12 until the two pins lift the front contact portions 35 of the outer arms 34 of the two-switch members 1-30, 2-30 to a raised position in which they release their locking engagement with the notched cam surface regions of the actuating member 80 whereupon the latter may be removed in the leftward direction as seen in Figs. 10, 12 from its position within the mounting body 1-12. The left side wall 18-4 of the mounting body 1-12 (Figs. 10, 13) is provided with a receiving opening 80-0 shown in Fig. 10-A which is of such shape and contour that all aligned raised cam surface portions 1-53, 3-53, 4-53 of the actuating member 50 and its octagonal guide regions 82, 83 may be inserted with its tapered front end 85 into the side wall opening 80-0 and brought into its inward operative position in which it is seen in Figs. 10 to 13, and wherein the actuating member 80 may be forcibly turned to any of its three setting positions.

In the form shown, the actuating member 80 may be inserted through the side wall opening 80-0 into its interior operative position within the mounting body 1-12 only when it is held in the angular position of its double-switch setting with its two raised cam surface regions 1-53, 2-53 aligned substantially in a vertical plane as seen in Figs. 10 to 13. The cylindrical left end 85 of the actuating member terminates in a radially tapered end surface portion arranged so that when inserted inwardly into the switch compartment 1-18 by way of the side wall receiving opening 80-0, the tapered end surface portion 85 of the actuating member will enter between the released opposite arms 33, 34 of each of the two switch members 1-30, 2-30 and spread them apart to permit further inward movement of the actuating member until it reaches the position in which it is seen in Figs. 10 and 12, whereupon the opposite arms 34, 33 of the two switch members 1-30, 2-30 will be released and dropped into the two sets of depressed notch-like control surface regions 1-51, 2-51, 1-51-1, 2-51-1 thereby interlocking the actuating member 80 in its inward operative position within the mounting body 1-12. Provision is also made to confine angular turning movement of the actuating member 80 in its retracted open position within the mounting body 1-12 to the angular range of its three different settings. To this end, the inward face of the left compartment side wall 18-4 (Figs. 10, 10-A, 11-A) provided with an inward stop projection 18-6 which engages the right side of the raised cam region 4-53 in the two-switch setting shown, and with an inward stop projection 18-7 which engages the left side of the raised cam region 4-53 when turned 90° left as seen in Fig. 11-A.

Otherwise, the socket mounting body 1-12 and its associate elements are constructed in the same manner as the coresponding parts of the socket of Figs. 1 to 9-E.

Figs. 14 to 33, inclusive, show a modified form of switch exemplifying the invention as embodied in a conventional lamp socket 5-10 adapted to receive a screw-type terminal base of a conventional electric light bulb. The socket 5-10 comprises a generally cylindrical housing 5-11 three sides of which are shown in Figs. 14, 15, 16. The housing 5-11 has an elongated actuating member 5-33 arranged to be moved laterally through passage openings in the opposite housing walls between the full-line position shown in Fig. 15 to the dash-line position 5-33-1 for bringing the internally housed switch from the open to the closed position, the return movement of the actuating member 5-33 to the full-line position restoring the switch to the open position. In the interior of the housing 5-11 is positioned a relatively rigid mounting body 5-20 of electrically insulating material such as molded synthetic resin material on which are mounted an electric light switch comprising a flexible switch member generally designated 5-30 arranged to close and open the light bulb circuit by making or breaking contact engagement with a fixed switch contact member shown diagrammatically at 5-48. The insulating mounting body 5-20 also serves as support for electric connector elements 5-37, 5-48 for 5-36 cooperating with the switch members 5-36, 5-48 for completing an energizing circuit from a domestic supply line indicated diagrammatically by a battery E to the electric light element of a conventional light bulb indicated diagrammatically at F. The bottom wall 5-17 of the insulating mounting structure 5-30 holds affixed within a channel shaped recess 5-27 thereof a mounting portion 5-81 of the flexible switch member 5-30. A tail-like terminal portion 5-82 extending from the fixed mounting portion of switch member 5-30 is arranged to be engaged by the central base terminal of a conventional screw-type terminal base of a conventional light bulb when it is turned in into the conventional cylindrical threaded metal terminal sleeve which connects one terminal of the light element by way of connector conductor 5-36 to one terminal of the electric supply E.

In the form shown in Figs. 17 and 18, the mounting portion 5-81 of the flexible switch member 30 is held clamped against a rear portion of the recessed mounting wall portion of the mounting channel 5-27 by locking elements 5-32 which are affixed or wedged into clamping position within side regions of the mounting channel 5-27.

The switch member 5-30 is formed out of a relatively stiff elastic sheet metal strip of suitable metal, such as beryllium copper bent into a generally S-shaped strip formation so as to provide an inner arm 5-37 having the mounting portion 5-81 with which it is held affixed to the mounting structure 5-20, and an outer contact arm which is arranged to be flexed outwardly from the full position shown in Fig. 24 to the outward dotted line position in which the contact end portion 5-83 of the switch member 5-30 makes contact with the fixed switch contact 5-38 of the socket. The rear part of the outer switch arm of switch member 5-30 is connected to the leftward end of the inner switch arm (as seen in Figs. 24, 27) by a generally U-shaped elbow or yoke 5-40. The switch member 5-30 is arranged to be actuated from the full-line open position shown in Fig. 24 to its dotted line circuit closing position by longitudinal movement of the actuating member generally designated 33 between its leftward full-line position shown in Fig. 2 to its rightward dotted line lefthand position 5-33-1 across the spacing separating the outer arm from the underlying mounting structure or more specifically, in the form shown, between the inner and the outer arms of the flexible switch member 5-30.

In order that the intended operation of the switch member or element 5-30, under the action of its cooperatively related switch-actuating member 5-33, may be fully realized, the inner or supporting arm 5-37 thereof and the outer contact arm 5-38 are reinforced or stiffened against flexing throughout definite portions of their respective lengths. As shown in Figs. 18, 24 to 27, the inner switch arm 37 is formed with a pair of downwardly turned marginal flanges 5–41; the outer switch arm 38 is formed at its free or contact end 5–83 with a pair of downwardly turned marginal flanges 5–42 and the intermediate portion 5–46 of the outer switch arm 5–28 is formed with a pair of marginal flanges 5–44, one of which is turned outwardly and the other of which is turned inwardly.

As shown in Figs. 18 and 24, the inner switch arm 5–37 of the switch element 5–30 is so formed as to prevent a generally vertical S-shaped leg 5–84 and an adjoining lower U-shaped yoke 5–85. The lower leg 5–82 of the U-shaped yoke 5–85 is disposed centrally of the lamp socket and serves as a yieldable or spring-like contact terminal adapted to engage the usual center base contact CC of an ordinary electric light bulb when it is introduced into the conventional terminal sleeve of the socket. The upper arm of the U-shaped yoke 5–85 is supported by that portion of the channel shape mounting wall section 5–17 which lies adjacent the switch mounting channel opening 5–24 by the overlying switch element retaining arms of the wedge members 5–32 held affixed within the channel opening 5–24.

The bridge-like mounting portion 5–81 of the U-shaped yoke portion 5–85 of switch member 5–30 is confined within the mounting channel opening 5–24 and is provided intermediate its ends with a hump-like arch, which, as shown in Fig. 24 impinges on the adjacent vertical face of the mounting wall section 5–17 while the end faces of the wedge members 32 engage said bridge mounting portion 5–81 of the switch member throughout a substantial extent of the same.

In fabricating the switch element 5–30, the metal entering into the same is, by the aid of suitable forming dies, so drawn or distorted at the juncture between the inner arm 5–37 and the elbow or yoke 5–40, as well as at the juncture between the outer contact arm 5–38 and said yoke 5–40, that under open-circuit conditions, the two switch arms 5–37, 5–38 are transversely inclined relatively the original transverse formation line of the metal strip out of which they are formed more particularly in Fig. 16.

Fig. 27 shows the transverse angular relationship existing between the switch arms 5–37 and 5–38 with relation to the original transverse formation line 6–30 of the metal strip hereinafter referred to as the "horizontal." As shown, two switch arms 5–37, 5–38 are respectively pitched transversely of themselves or their original transverse horizontal base line 6–30 to the extent of 5° and 14°, respectively.

In order to facilitate proper operative flexing of the switch element 5–30 at definite locations when it is deformed in switch closing and opening operations, it is provided (Fig. 27) with three pairs of marginal notches 5–45, 5–46, 5–47, the notches 5–45 and 5–46 being formed, respectively, at the junctures between the yoke 5–40 and its associated inner arm 5–37 and outer arm 5–38, whereas the notches 5–47 are formed wholly within the outer arm 5–38 at points adjacent its free or contact end portion 5–83. Normally, as when the switch element 5–30 is in open-circuit condition, the inner switch arm 5–37 forms with the adjacent leg of the yoke 5–40 an angle of 133°, and the outer contact arm 5–38 forms with the other leg of said yoke 5–40 an angle of 100°, whereas the outer contact arm 5–38 and its included free or contact end are disposed in a common plane, and the legs of said yoke 40 form with each other an angle of 120°.

As the switch element 5–30 is distorted under the action of the switch actuating member 5–33, in the manner hereinafter more particularly described for closing the switch circuit the inner supporting arm 5–37 is forcibly depressed and the outer contact arm 5–38 is forcibly moved upwardly until it reaches a point at which at least a portion of the energy stored in the switch element 5–39 incident to its being distorted is released and thereupon utilized to further the upward movement of the outer contact arm 5–32 and cause its free or contact end 5–83 to move with a snap action into circuit closing engagement with a cooperatively related switch terminal 5–48. The energy released from the switch element 5–30 as the contact arm 5–38 approaches its closed circuit position is not only sufficient to move its free or contact end 5–83 into engagement with the fixed switch terminal 5–48 but is also sufficient to flex the outer contact arm 5–38 in the vicinity of its notches 5–47, at the instant its free end 5–83 engages the fixed terminal 5–48, so as to insure an intimate face-to-face wiping control engagement between the contact surface of said terminal 5–48 and the contact surface of the free contact 5–83 of said arm 5–38.

As the outer contact arm 5–38 is moved upwardly while the supporting arm 5–37 is being depressed, the switch element 5–30 is so flexed in the vicinity of its notches 5–46 that the above mentioned angle of 100° is increased.

Since the supporting arm 5–37 is forcibly moved downwardly while the contact arm 5–38 is being forcibly moved upwardly, it follows that oppositely directed forces are transmitted to the yoke 5–40 by way of said arms, the forces thus exerted on the yoke 5–40 being such that they cause the ends of the yoke 5–40 to move relatively away from each other. As the ends of the yoke 5–40 are moved relatively away from each other, the legs of the yoke 5–40 move towards positions of alignment with each other, with the result that the above-mentioned angle of 133° between them is decreased according to the extent to which that the yoke leg which is connected to the supporting arm 5–37 is moved towards a right angle position with relation to such arm.

In general, such flexing of the supporting arm 5–37 as is effected incident to its bieng depressed takes a place in the general vicinity of its point of connection with the S-shaped leg portion 5–85. The leg 5–84 of the switch 5–30 will flex or yield, especially in the vicinity of its arcuate portions, due to the strain transmitted to it by way of the inner arm 5–37 as that arm is depressed.

In performing the shaping operation necessary to obtain the 14°-pitch peculiar to the different switch arms 5–37, 5–38 described above, the switch element 5–30 is provided with a relatively sharp bend 5–50 as shown in Figs. 22, 24. In order to distribute the strains to which the yoke part 5–40 is subjected when the outer contact arm 5–38 is elastically flexed to the outward closing position, the outer contact arm 5–38 and the adjoining yoke 5–40 are provided with a tapered stress distributing section 5–51 which, as shown in Figs. 27, 28–A, 28–B, tapers from the point where it joins the rear end of the flanged stiff outer contact arm 5–38 towards the wider rear region of the U-shaped yoke 5–40.

The switch actuating member 5–33 is shown in detail in Figs. 20, 21, 22 and 29 to 33, and is formed of a suitable hard-face insulating material, such as molded synthetic resin. In the specific form shown in these figures, the switch actuating member 5–33 is provided with control or cam surface elements which includes an elongated flat surface guide 5–52 which gives it a substantially D-shaped cross-section.

The switch actuating member 5–33 extends transversely through the switch chamber 5–18 and projects at opposite ends beyond the side walls of the mounting body 5–20 and the surrounding socket housing 5–11 (Figs. 14 to 18). To guide the actuating member 5–33 in a reciprocatory movement when closing and opening the switch member 5–30, the side walls of the mounting body 5–20 are provided with guide passage openings 5–56 and 5–57, which are substantially D-shaped and conform to the cross-sectional contour of the opposite end guide portions 5–54, 5–55 of the actuating member 5–33 so that it shall be free to slide longitudinally of itself, but be at all times restrained against undue rotation with respect to its longitudinal axis. The end portion 5–54 of the switch actuating member 5-33 is substantially larger than its opposite end portion 5-55 and the correspondingly sized guide passage opening 5-56, 5-57 are arranged so that the actuating member 5-33 may be inserted into its operative position (Figs. 18, 19, 24) through the passage opening 5-56 only. Because of the size and shape of the passage openings 5-56 and 5-57 of the mounting body 5-20, the respective switch actuating member 5-33 may be readily inserted into its operative position within the mounting body 5-20 after it is positioned within the socket housing 5-11 which has similar guide passage openings 6-56, 6-57 as the final step among the various assembly operations that are carried out in producing the structure herein illustrated as an embodiment of the present invention. The just described mounting arrangement also precludes the possibility of that actuating member 5-33 may be assembled with the associated switch structure in other than the intended operative position.

The switch actuating member 5-33 is of such length that its opposite ends 5-54, 5-55 project beyond the outer surface of the socket housing 5-11 under open circuit and closed circuit conditions, the open circuit position of the actuating member being shown in Fig. 2 in full lines and its closed circuit position being indicated in dotted lines.

The guide opening 5-56, 5-57 are so located on the mounting body 5-20 that the intermediate portion of the switch actuating member 5-33 is disposed between the supporting arm 5-37 and the contact arm 5-38 of the switch element 5-30 in order that said arms may be subjected to the action of a composite cam surface region 5-90 which extends throughout a substantially intermediate portion of the length of said actuating member 5-33 and which is shaped and arranged as to cause the contact arm 5-38 of the switch element 5-30 to move with a snap action into and out of closed circuit position with respect to its associated fixed switch contact 5-48.

As shown in Figs. 20 to 33, the cross-sectional contour of the cam region 5-90 of the switch actuating member 5-33 varies throughout its length and it includes a series of subordinate cam elements which are of various shape, lengths and pitches and are so related to each other that they engage the switch element 5-30 in a definite order as the switch actuating member 5-33 is moved to its respective closed and open circuit positions.

Rather than attempt to geometrically define the exact extent of the above-mentioned subordinate cam elements, it is deemed best in the interest of clarity, to consider them as co-extensive with their working faces which may be readily identified by the applied stippling shown in Figs. 20 and 22.

Taking into account the above-mentioned stippling, the composite cam 5-90 includes a plurality of subordinate cams 5-91, 5-92, 5-93 in association with a holding cam face 5-94 and subordinate cams 5-91-1 in association with a holding cam face 5-91-4 provided respectively on the upper and lower surfaces of the switch actuating member 5-33.

As shown in Fig. 22, the cams 5-91-1 and 5-92-1 are located at opposite sides of a vertical central plane passing longitudinally through the switch actuating member 5-33 and are contained within a relatively slight depression 5-58 formed in the lower side throughout a substantial length thereof. The cam 5-93-1 is relatively short in extent and is located on the lower face of a rib-like projection 5-60 which is disposed at right angles to the above-mentioned vertical plane 5-52 of the switch actuating member 5-33. The rib projection 5-66 extends substantially throughout the length of the larger guide end 5-54 of the actuating member 5-33 to a point in the vicinity of the cam 5-92-1 adjacent to which the cam 5-91-1 and also the cam 5-91-1 are disposed in relatively close proximity. The holding cam face 5-94-1 is located adjacent to the cam 5-93-1 and forms a "flat" in the cam 5-90, it being provided on the lower straight-away surface of the larger guide end 54 of the switch actuating member 5-33, and there functioning in conjunction with the holding cam face to maintain the switch element 5-30 in the closed circuit position.

As shown in Fig. 20, the cams 5-91 and 5-92 are located at the same side of the above-mentioned central vertical plane as the cam 5-91-1 and are contained within a relatively deep top depression 5-61 formed in the upper portion of the switch actuating member 5-33 and extending throughout a substantial length of the same so as to form, in conjunction with the bottom depression 5-58, a neck-like section 5-62 which is disposed intermediate the opposite guide ends 5-54, 5-55 of the actuating member 5-30, and on which depressions are located the cam 5-91, 5-92 and 5-91-1, 5-91-2. The cam 5-93 is relatively short in extent and is generally located on the side and near the top of a fin-like flange projection 5-64 included as an integral part of the switch actuating member 5-33 and disposed at right angles to the above-mentioned rib-like projection 5-60. The fin-like flange 5-64 is so shaped in the vicinity of the cam 5-93 as to there define the contour of a portion of the depression 5-61 and that said flange 5-64 tapers to a relatively narrow width throughout a substantial portion of itself as measured from the point at which its upper straight surface starts tapering into depression 5-61. The holding cam face 5-94 is located adjacent to the cam 5-93 and forms as a "flat" in the cam 5-90 C, it being provided on the straight top surface of the cam region 5-90 and arranged to function in conjunction with the bottom holding cam face 5-94-1 to maintain the switch element 30 in closed circuit position.

As shown in Fig. 6, the mounting body 5-20 may be formed of two vertically split body sections and is so shaped and arranged that the switch element 5-30 may be readily assembled thereon before the two body sections are assembled into a unitary body in face-to-face registration and suitably anchored to each other with the two switch-element-retaining wedges 5-32 firmly clamped with the open channel 5-27 in a position in which the mounting portion 5-81 of the switch member 5-30 is firmly affixed to the mounting wall sections 5-17. The connector conductor 5-36 may be mounted in a wall channel 5-35 of the mounting body 5-20. After assembling the switch element 5-30 and the connector conductor 5-36 on the mounting body 5-20, the switch actuating member 5-33 may be in its operative position therein and within the socket housing 5-11 by way of the aligned passage openings 5-56, 5-57, 6-56, 6-57, respectively so that the cam region 5-90 of the actuating member 5-33 C will assume its operating position between the supporting arm 5-37 and the contact arm 5-38 of the switch element 5-33 with the opposite ends 5-54, 5-55 of the actuating member 5-33 positioned in the opposite guide passage openings within which they slide as the actuating member 5-32 is moved into and out of its open and closed circuit positions.

Referring to Fig. 2, when operating the switch, and the switch actuating member 5-33 is moved from its full line or open circuit position to its dotted line or closed circuit position and vice versa, the switch element 5-30 will be actuated with a snap action to assume closed circuit and open circuit positions, respectively. As the switch actuating member 5-33 approaches closed circuit position, the contact arm 5-38 of the switch element 5-30 moves with a snap action into engagement with the switch terminal 5-48, thereby establishing a closed circuit condition. On the other hand, as the switch actuating member 5-33 is moved in opposite direction to open circuit position, the contact arm 5-38 of the switch element 5-30 moves with a snap action out of engagement with the switch terminal 5-48 thereby establishing an open circuit condition.

Referring to Figs. 2 and 8 to 27, the switch actuating member 5-33 is moved from its full line or open circuit position to its dotted line or closed circuit position (Fig. 2) and the cam 5-91 engages the supporting arm 5-37 and moves the same downwardly to a slight extent. Immediately following the initiation of such downward movement of the supporting arm 5-37, the cam 5-91 engages the contact arm 5-38 and moves it upwardly towards its closed circuit position.

In the further longitudinal displacement of the switch actuating member 5-33 to its closed circuit position, the supporting arm 5-37 and the contact arm 5-38 leave cam portions 5-91, 5-91-1 and engage portions 5-92, 5-92-1 which then respectively function to further raise the contact arm 5-38 and lower the supporting arm 5-37.

As the contact arm 5-38 and the support arm 5-37 are being moved respectively upwardly and downwardly under the action of the cams 5-91, 5-92 and 5-91-1 and 5-92-1 the two arms 5-38, 5-37 are subjected by these cams to such transverse torsional strains that their respective angles of 14° and 90° to the original formation or horizontal line 6-30 (Fig. 27) are being reduced and brought to about zero at or about the instant two switch arms 5-37 and 5-38 are brought by cams 5-92, 5-92-1 to positions of the greatest separation between them.

As the contact arm 5-38 is moved upwardly under the action of the cams 5-91 and 5-92, the contact arm 5-38 is subjected to a lateral thrust which is exerted thereon by the switch actuating member 5-33 in the direction of its initial movement towards its closed circuit position. By reason of the lateral thrust thus exerted thereon, the contact arm 5-38, such arm, as illustrated in Fig. 14, is deflected from a straight line course upward movement (Fig. 25) with the result that the switch element 5-30 additionally deformed in lateral direction thereby building up therein a substantial amount of elastic restoring energy which acts on the contact arm 5-38 in a direction opposite to that in which it is laterally deflected during the initial movement of the switch actuating member 5-33 towards its closed circuit position. This stored elastic deformation is utilized to effect movement of the contact arm 5-38 into its closed circuit position with a snap action.

In the course of the just described movement of the actuating member 5-33, the supporting arm 5-37 leaves cam 5-92-1 and engages the more outward cam 5-93-1 thereby further compressing its adjoining elastic elements 5-84, 5-85. The two opposite switch arms 5-38, 5-37 reach at about the same instant the outermost portion of the respective cams 5-93, 5-93-1 of the moving actuating member 5-33 at which movement the contact arm is released from cam 5-93, 5-92, whereupon the deforming energy stored by the lateral arm movement is abruptly released thereby causing the contact arm 5-38 to move from cam 5-93 upwardly with a snap action into wiping contact engagement with the switch terminal 5-48. As the snap action circuit closing movement of the contact arm 5-38 is thus effected, its free contact end 5-82 swings through an appreciable lateral arc in a direction opposite to the movement imparted thereto by the actuating member 5-33 and in doing so makes a wiping contact with the terminal 5-48 upon engagement therewith and comes to rest in a centered relation thereon, as shown in Fig. 25.

Referring to Fig. 25, after the contact arm 5-38 has assumed a centered position on the terminal 5-48 and during such time as the switch actuating member 5-33 is being moved slightly further towards its dotted line position (Fig. 2), the cam 5-93 moves along under the contact arm as the supporting arm 5-37 is further depressed under the action of the cam 5-93-1. Finally, the cam 5-93 delivers the contact arm 5-38 to the holding face 5-94 and simultaneously the cam 5-93-1 is released from its engagement with the inner arm 5-37. Complete delivery of the contact arm 5-38 and the supporting arm 5-37 to the respective holding cam faces 5-94 and 5-94-1 is effected at or about the time the switch actuating member 5-33 assumes its dotted line position (Fig. 2) whereupon the contact arm 5-38 and the supporting arm 5-37 throughout their respective widths, firmly impinge on the holding cam faces 5-94 and 5-94-1 respectively, and thus serve to hold the switch actuating member against undue return movement to open circuit position. In order to prevent the switch actuating member 5-33 from being moved past its closed dotted line position (Fig. 2), the mounting body 5-20 has a stop abutment 5-65 which engages and stops the rib-like stop protrusion 5-60 immediately following the complete transfer of the contact arm 5-38 and the supporting arm 5-37 to the respective holding cam faces 5-94 and 5-94-1.

The openings 5-56 and 5-57 of the mounting body 5-20 are slightly oversize with relation to the switch actuating member 5-33 so as to provide a slight clearance therefor at its respective ends. This clearance permits the switch actuating member 5-33 to undergo a slight rotative movement in a clockwise direction (Fig. 14) under the forces respectively exerted on the cams 5-93 and 5-93-1 by the switch arm 5-38 at or about the time it begins its upward snap action movement, the rotative movement of the switch actuating member being of such extent and taking place at such time that pronounced smoothness in the snap action movement of the contact arm is assured. When the switch actuating member 5-33 is in its dotted line closed position (Fig. 2), its smaller end 3-55 projects a sufficient distance beyond the socket housing 5-11 to permit said actuating member 5-33 due to its depression 5-58, to drop slightly at its smaller end and thus assume a position representing an appreciable angle with relation to its initial line of travel. It is immediately prior to the instant at which the contact arm 5-38 is released from the cam 5-92, 5-93 as to effect its upward snap action movement that the actuating member 5-33 is forcibly dropped or depressed under the influence of the pressure exerted thereon by the contact arm 5-38, accounted for in an appreciable measure by the sudden downward displacement of said actuating member as brought about under the conditions described.

Assuming the switch 5-30 to be closed, an open circuit condition thereof may be effected by moving the switch actuating member 5-33 slightly to the left from its dotted line position (as seen in Fig. 2) whereupon the elastic deforming forces stored in the outwardly deformed switch member 5-30 cause it to open its circuit with a snap action and at the same time to return the switch actuating member 5-33 to its open full line position.

As the switch actuating member 5-33 is initially moved to the left from its dotted line closed position, the contact arm 5-38, due to its frictional engagement with the holding cam face 5-94 of the actuating member 5-33 is moved slightly in unison therewith to the left as seen in Fig. 25 and thereby placed under sufficient lateral strain to overcome the friction between said holding cam face 5-94 and the engaged surface of the contact arm 5-38. At the instant such friction is overcome, the free end of the laterally deformed contact arm 5-38 remains stationary until such time in the course of the further initial movement of the actuating member 5-33 its holding cam face 5-94 is disengaged therefrom and reaches inwardly tapering cam surface 5-93. When the contact arm 5-38 reaches the outer end of the inwardly inclined cam 5-93, the deforming energy stored in the switch member 5-30 is released with a snap action to its open position. In doing so, the released contact arm 5-38 acting on inwardly tapering cam 5-93 forces the switch actuating member 5-33 with a snap action to its leftward open position. The speed at which the switch actuating member 5-33 is impelled in the circuit opening operation is so great that cams 5-92 and 5-91 remain untouched by the released contact arm 5-38.

At the instant the contact arm 5-38 is transferred from the holding cam face 5-94 to the cam 5-93, the supporting arm 5-37 is released from the holding face 5-94-1. At the instant such release is effected, the supporting arm 5-37 engages the cam 5-93-1 which then acts in further movement of the switch actuating member 5-33 to permit the yoke 5-40 to slightly contract under the strain previously set up therein by said cam in establishing a closed circuit condition of the switch and as a result, the supporting arm 5-37 is moving upwardly towards the cam 5-92-1. It will be understood, of course, that the instant the supporting arm 5-37 engages the cam 5-93-1, an upward pressure is exerted against cam 5-93-1 by the supporting arm 5-37 which operates analogous to the downward pressure, exerted on the upper cam by the upper contact arm 5-38, to impel the switch actuating member 5-33 to its full line left open position. Due to the speed at which the switch actuating member 5-33 is impelled in the circuit opening operation, cams 92-1 and 91-1 remain substantially untouched by the supporting arm 5-37.

Regardless of the force with which it is impelled during the circuit opening operation, the switch actuating member is effectively restrained against displacement beyond its full line operative position (Fig. 2) by reason of the fact that it will have assumed such a position that its upwardly inclined face 5-66 of the depression 5-61 will engage the released contact arm 5-38 thereby locking the actuating member 5-33 at the instant it reaches its open position.

Because of the above-described relationship of the contact arm 5-38 to its inclined face 5-66 of the actuating member 5-33 it will be automatically locked in its operative position once it is introduced into the assembly and it will be retained under all ordinary circumstances against accidental removal by way of the wider opening 5-56 which makes such introduction possible. However, when it is necessary or desirable to remove the switch actuating member 5-33 from the assembly, such removal may be readily facilitated by introducing the end of a suitable instrument such as a pin into the switch chamber 5-18 by way of the opening 5-28 (Fig. 2) and lifting the contact arm 5-38 out of restraining position with relation to said actuating member 5-33 so as to permit withdrawal thereof by way of the opening 5-56.

Although in the switches of the invention described above, the control surface elements of the actuating member which actuate the flexible switch member to close and open its switch contacts with a snap action are part of a longitudinally movable actuating member of a generally straight elongated actuating member moving in the direction of its major longitudinal axis, similar control surface elements may be formed on surface portions of an actuating member arranged to rotate around an axis so as to bring successive control surface elements formed on an arcuate portion thereof, into control engagement with the arms of the switch member between which they move.

The features and principles underlying the invention described above in connection with specific exemplifications, will suggest to those skilled in the art many other modifications thereof. It is accordingly desired that the appended claims shall not be limited to any specific features or details shown and described in connection with the exemplifications thereof.

I claim:

1. In an electrical switch arrangement having a mounting structure, an electric contact element on said mounting structure, and an elongated elastically deformable switch member having an inner arm held by said mounting structure and a flexible outer contact arm carried by said inner arm at an arm spacing from said mounting structure; said switch member being normally biased by its elastic restoring energy to an open position in which the contact arm is out of contact with said contact element; a switch actuating member having shaped, exposed, control surface elements arranged for progressive movement within said arm spacing between a closed position in which said actuating member maintains said contact arm in the closed position in contact with said contact element and an open position in which said contact arm is released to its open position; certain shaped control surface elements of said actuating member being effective to cause a partial movement of said actuating member from its closed position toward its open position to laterally flex said contact arm while it is maintained in contact with said contact member and certain shaped control surface elements being effective to cause a further movement of said actuating member to the open position to suddenly release restoring energy stored in said switch member and cause the contact arm to be released from contact with said contact member with a snap action.

2. In an electrical switch arrangement having a mounting structure, an electric contact element on said mounting structure, and an elongated elastically deformable switch member having an inner arm held by said mounting structure and a flexible outer contact arm carried by said inner arm at an arm spacing from said mounting structure; said switch member being normally biased by its elastic restoring energy to an open position in which its contact arm is out of contact with said contact element; a switch actuating member having shaped exposed control surface elements arranged for progressive movement within said arm spacing between a closed position in which said actuating member maintains said contact arm in the closed position in contact with said contact member and an open position in which said contact arm is released to its open position; certain shaped control surface elements of said actuating member being effective to cause a partial movement of said actuating member from its open position toward its closed position to laterally flex said contact arm against the action of said restoring energy and to cause a further movement of said actuating member toward its closed position to release restoring energy stored in said switch member by said lateral flexing and cause the contact arm to be brought with a snap action into its closed contact position.

3. In an electrical switch arrangement having a mounting structure and a contact member held by said mounting structure; an elongated elastically deformable flexible switch member having an inner arm carried by said mounting structure and at an arm spacing from said mounting structure an outer contact arm carried by said inner arm, said switch member being normally biased by its elastic restoring energy to an open position in which its contact arm is out of contact with said contact member and being movable in a switching direction to a closed position in which said contact arm is in contact with said contact member; a switch actuating member having shaped exposed control surface elements arranged for progressive movement through said arm spacing in a direction lateral to said switching direction between a closed position in which said actuating member maintains said contact arm in said closed position and an open position in which said contact arm is released to said open position; certain shaped control surface elements of said actuating member being effective during a partial movement of said actuating member from its open position toward its closed position to laterally flex said contact arm in said lateral direction against the action of said restoring energy and certain shaped control surface elements being effective during a further movement of said actuating member toward its closed position to release restoring energy stored in said switch member by said lateral flexing and cause the contact arm to be brought with a snap action and a contact wiping action into its closed contact position.

4. In an electrical switch arrangement having an electric contact member and a loop-shaped elastically-deformable flexible switch member having an inner arm and an outer contact arm separated by an arm spacing from said inner arm; said switch member being normally biased by its elastic restoring energy to an open position in which its contact arm is out of contact with said contact member; a switch actuating member having shaped exposed control surface elements arranged for progressive movement within said arm spacing between a closed position in which said actuating member maintains said contact arm in the closed position in contact with said contact member and an open position in which said contact arm is released to its open position; certain shaped control surface elements of said actuating member being effective during partial movement of said actuating member from its closed position toward its open position to laterally flex said contact arm while it is maintained in contact with said contact member and certain shaped control surface elements of said actuating member being effective during further movement of said actuating member to the open position to suddenly release restoring energy stored in said switch member and cause the contact arm to be released from contact with said contact member with a snap action.

5. In an electrical switch arrangement having an electric contact member and a loop-shaped elastically-deformable flexible switch member having an inner arm and an outer contact arm separated by an arm spacing from said inner arm; said switch member being normally biased by its elastic restoring energy to an open position in which its contact arm is out of contact with said contact member; a switch actuating member having shaped exposed control surface elements arranged for progressive movement within said arm spacing between a closed position in which said actuating member maintains said contact arm in the closed position in contact with said contact member and an open position in which said contact arm is released to its open position; certain shaped control surface elements of said actuating member being effective during a partial movement of said actuating member from its open position toward its closed position to laterally flex said contact arm against the action of said restoring energy and certain shaped control surface elements being effective during a further movement of said actuating member toward its closed position to release restoring energy stored in said switch member by said lateral flexing and cause the contact arm to be brought with a snap action into its closed contact position.

6. In an electrical switch arrangement having a contact member and a loop-shaped elastically deformable flexible switch member having an inner arm and an outer arm separated by an arm spacing from said inner arm, said switch member being normally biased by its elastic restoring energy to an open position in which its contact arm is out of contact with said contact member, a switch actuating member having opposite sets of shaped exposed control surface elements arranged for progressive longitudinal movement within said arm spacing between a closed position in which said actuating member maintains said contact arm in closed position and an open position in which said contact arm is released to its open position, successive longitudinal portions of said opposite sets of control surface elements being arranged for successive engagement with said contact arm and said inner arm, respectively, when said actuating member is moved to its closed position for causing said two arms to be moved in opposite direction while said contact arm is being moved to its closed position, at least one of said sets of control surface elements also including a control portion arranged to maintain at least one of said arms under tension as movement of said actuating member from the closed position towards its open position is initiated and being effective upon initial movement of said actuating member from the closed position towards its open position for causing said stored energy to return said actuating member to its open position.

7. In a switch arrangement as claimed in claim 3, said actuating member having a recessed detent portion along an intermediate section thereof and said switch member being elastically biased to a locking position in which it tends to maintain locking engagement with said detent portion for restraining said actuating member from removal from its open position in a direction opposite to its movement towards its closed position.

8. In a switch arrangement as claimed in claim 3, some of said control surface elements of said actuating member being effective during partial initial movement thereof from its closed to its open position to release the restoring energy stored in said switch member in its closed position and to cause said contact arm to be released from contact with said contact member with a snap action.

9. In a switch arrangement as claimed in claim 8, said actuating member having a recessed detent portion along an intermediate section thereof and said switch member being elastically biased to a locking position in which it tends to maintain locking engagement with said detent portion for restraining said actuating member from removal from its open position in a direction opposite to its movement towards its closed position.

10. In a switch arrangement as claimed in claim 9, said mounting structure having a stop portion arranged to engage a portion of said actuating member to prevent its movement beyond its said closed position.

11. In a switch arrangement as claimed in claim 3, some of said control surface elements of said actuating member being effective during partial initial movement thereof from its closed to its open position to release the restoring energy stored in said switch member in its closed position and to cause said contact arm to be released from contact with said contact member with a snap action, some of said shaped control surface elements of said actuating member being shaped for engagement with portions of and actuation by the restoring energy of the released switch member to return said actuating member to its open position as said switch member is returned by said energy to its open position.

12. In a switch arrangement as claimed in claim 4, some of said shaped control surface elements of said actuating member being shaped for engagement with portions of and actuation by the restoring energy of the released switch member to return said actuating member to its open position as said switch member is returned by said energy to its open position.

13. In a switch arrangement as claimed in claim 4, some shaped surface elements of said actuating member being arranged to cooperate with said inner arm for moving said inner arm in a direction away from said contact arm and store adidtional energy in said switch member when said contact arm is actuated by said actuating member to the closed position and thereby cause said additional energy to increase the pressure with which said contact arm is held in the closed postion against said contact member.

14. In a switch arrangement as claimed in claim 4, said switch member having also an elastically flexible backing portion carrying said inner arm and said contact arm in their operative positions, some of said shaped surface elements being arranged to cooperate with said inner arm for moving said inner arm and said backing portion in a direction away from said contact arm and store additional energy when said contact arm is actuated by said actuating member to the closed position and thereby cause said additional energy to increase the pressure with which said contact arm is held in said closed position.

15. In a switch arrangement as claimed in claim 4, at least one additional elastically deformable switch member having a contact arm arranged to be selectively actuated by said actuating member between a closed and open position.

16. In a switching device as claimed in claim 1, said elongated switch member being formed of an elongated metal strip, said outer arm having a stiff outer contact end portion and a stiff outer arm portion separated from said contact end portion by a flexible strip portion, said stiff outer arm portion being arranged for engagement with some of said control surface elements of said actuating member.

17. In a switching device as claimed in claim 16, said inner arm having a stiff inner arm portion shaped for engagement with some of said control surface elements and being separated by a flexible strip portion from said stiff outer arm portion.

18. In a switching device as claimed in claim 17, said metal strip having also an anchoring portion separated from said stiff inner arm portion by an intermediate flexible strip portion which permits flexing of said stiff inner arm portion relatively to said anchoring portion.

19. In a switching device as claimed in claim 18, substantially all longitudinal elements of said elongated switch member being formed of a metal of substantially the same thickness, said stiff parts of said switch member having marginal flange portions formed on side edges of the stiff switch strip parts.

20. In a switching device as claimed in claim 19, the longitudinal strip portions constituting said stiff inner arm portion and said anchoring portion being twisted in their longitudinal relation relatively to each other.

21. In a switching device as claimed in claim 20, the longitudinal strip portions constituting said stiff outer arm portion and said stiff inner arm portion being twisted in their longitudinal relation relatively to each other.

22. In a switching device as claimed in claim 2, said elongated switch member being formed of an elongated metal strip, said outer arm having a stiff outer contact end portion and a stiff outer arm portion separated from said contact end portion by a flexible strip portion, said stiff outer arm portion being arranged for engagement with some of said control surface elements of said actuating member.

23. In a switching device as claimed in claim 22, said inner arm having a stiff inner arm portion shaped for engagement with some of said control surface elements and being separated by a flexible strip portion from said stiff outer arm portion.

24. In a switching device as claimed in claim 23, said metal strip having also an anchoring portion separated from said stiff inner arm portion by an intermediate flexible strip portion which permits flexing of said stiff inner arm portion relatively to said anchoring portion.

25. In a switching device as claimed in claim 24, substantially all longitudinal elements of said elongated switch member being formed of a metal of substantially the same thickness, said stiff parts of said switch member having marginal flange portions formed on side edges of the stiff switch strip parts.

26. In a switching device as claimed in claim 25, the longitudinal strip portions constituting said stiff inner arm portion and said anchoring portion being twisted in their longitudinal relation relatively to each other.

27. In a switching device as claimed in claim 26, the longitudinal strip portions constituting said stiff outer arm portion and said stiff inner arm portion being twisted in their longitudinal relation relatively to each other.

28. In a switching device as claimed in claim 3, said elongated switch member being formed of an elongated metal strip, said outer arm having a stiff outer contact end portion and a stiff outer arm portion separated from said contact end portion by a flexible strip portion, said stiff outer arm portion being arranged for engagement with some of said control surface elements of said actuating member.

29. In a switching device as claimed in claim 28, said inner arm having a stiff inner arm portion shaped for engagement with some of said control surface elements and being separated by a flexible strip portion from said stiff outer arm portion.

30. In a switching device as claimed in claim 29, said metal strip having also an anchoring portion separated from said stiff inner arm portion by an intermediate flexible strip portion which permits flexing of said stiff inner arm portion relatively to said anchoring portion.

31. In a switching device as claimed in claim 30, substantially all longitudinal elements of said elongated switch member being formed of a metal of substantially the same thickness, said stiff parts of said switch member having marginal flange portions formed on side edges of the stiff switch strip parts.

32. In a switching device as claimed in claim 31, the longitudinal strip portions constituting said stiff inner arm portion and said anchoring portion being twisted in their longitudinal relation relatively to each other.

33. In a switching device as claimed in claim 32, the longitudinal strip portions constituting said stiff outer arm portion and said stiff inner arm portion being twisted in their longitudinal relation relatively to each other.

34. In a switching device as claimed in claim 4, said elongated switch member being formed of an elongated metal strip, said outer arm hacing a stiff outer contact end portion and a stiff outer arm portion separated from said contact end portion by a flexible strip portion, said stiff outer arm portion being arranged for engagement with some of said control surface elements of said actuating member.

35. In a switching device as claimed in claim 34, said inner arm having a stiff inner arm portion shaped for engagement with some of said control surface elements and being separated by a flexible strip portion from said stiff outer arm portion.

36. In a switching device as claimed in claim 35, said metal strip having also an anchoring portion separated from said stiff inner arm portion by an intermediate flexible strip portion which permits flexing of said stiff inner arm portion relatively to said anchoring portion.

37. In a switching device as claimed in claim 36, substantially all longitudinal elements of said elongated switch member being formed of a metal of substantially the same thickness, said stiff parts of said switch member having marginal flange portions formed on side edges of the stiff switch strip parts.

38. In a switching device as claimed in claim 37, the longitudinal strip portions constituting said stiff inner arm portion and said anchoring portion being twisted in their longitudinal relation relatively to each other.

39. In a switching device as claimed in claim 38, the longitudinal strip portions constituting said stiff outer arm portion and said stiff inner arm portion being twisted in their longitudinal relation relatively to each other.

40. In a switching device as claimed in claim 5, said elongated switch member being formed of an elongated metal strip, said outer arm raving a stiff outer contact end portion and a stiff outer arm portion separated from said contact end portion by a flexible strip portion, said stiff outer arm portion being arranged for engagement with some of said control surface elements of said actuating member.

41. In a switching device as claimed in claim 40, said inner arm having a stiff inner arm portion shaped for engagement with some of said control surface elements and being separated by a flexible strip portion from said stiff outer arm portion.

42. In a switching device as claimed in claim 41, said metal strip having also an anchoring portion separated from said stiff outer arm portion by an intermediate flexible strip portion which permits flexing of said stiff inner arm portion relatively to said anchoring portion.

43. In a switching device as claimed in claim 42, substantially all longitudinal elements of said elongated switch member being formed of a metal of substantially the same thickness, said stiff parts of said switch member having marginal flange portions formed on side edges of the stiff switch strip parts.

44. In a switching device as claimed in claim 43, the longitudinal strip portions constituting said stiff inner arm portion and said anchoring portion being twisted in their longitudinal relation relatively to each other.

45. In a switching device as claimed in claim 44, the longitudinal strip portions constituting said stiff outer arm portion and said stiff inner arm portion being twisted in their longitudinal relation relatively to each other.

References Cited in the file of this patent

UNITED STATES PATENTS

| | | |
|---|---|---|
| 585,915 | Johnston | July 6, 1897 |
| 987,306 | Klein | Mar. 21, 1911 |
| 1,635,170 | Benjamin | July 12, 1927 |
| 1,646,964 | Hopkins | Oct. 25, 1927 |
| 2,352,248 | Bramming | June 27, 1944 |
| 2,431,197 | Platt et al. | Nov. 18, 1947 |

FOREIGN PATENTS

| | | |
|---|---|---|
| 574,576 | Germany | Apr. 18, 1933 |